(12) United States Patent
McLain et al.

(10) Patent No.: US 10,518,384 B2
(45) Date of Patent: *Dec. 31, 2019

(54) ADJUSTABLE STROKE MECHANISM FOR RANDOM ORBITAL MACHINE

(71) Applicant: Lake Country Manufacturing Inc., Oconomowoc, WI (US)

(72) Inventors: Scott S. McLain, Mukwonago, WI (US); Mark Snyker, Apple Valley, MN (US)

(73) Assignee: Lake Country Tool, LLC, Oconomowoc, WI (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/678,553

(22) Filed: Aug. 16, 2017

(65) Prior Publication Data

US 2017/0341202 A1    Nov. 30, 2017

Related U.S. Application Data

(63) Continuation-in-part of application No. 15/339,317, filed on Oct. 31, 2016, now Pat. No. 10,144,106.

(Continued)

(51) Int. Cl.
*B24B 47/12* (2006.01)
*B24B 23/02* (2006.01)
(Continued)

(52) U.S. Cl.
CPC ............. *B24B 47/12* (2013.01); *B24B 23/02* (2013.01); *B24B 23/04* (2013.01); *F16C 3/28* (2013.01); *F16C 19/06* (2013.01); *F16C 2322/50* (2013.01)

(58) Field of Classification Search
CPC ......... B24B 47/12; B24B 23/02; B24B 23/04; B24B 23/028; B24B 23/03; F16C 19/06; F16C 19/08; F16C 19/54; F16C 2322/50
(Continued)

(56) References Cited

U.S. PATENT DOCUMENTS

| 169,753 A | 11/1875 | White |
| 4,610,111 A * | 9/1986 | Cox ........................ B24B 23/02 |
| | | 279/6 |

(Continued)

FOREIGN PATENT DOCUMENTS

| EP | 0 157 532 | 10/1985 |
| EP | 0 820 838 | 1/1998 |

(Continued)

*Primary Examiner* — George B Nguyen
(74) *Attorney, Agent, or Firm* — Harness, Dickey & Pierce, P.L.C.

(57) ABSTRACT

An adjustable stroke mechanism for a random orbital machine including a housing having a wall enclosing a cavity, an adjuster ring surrounding the housing and having a first set of gear teeth along a first portion of an inner surface, and a second set of gear teeth along a second portion of the inner surface, a counterweight having gear teeth on an exterior surface disposed within the housing, and a bearing carriage having gear teeth disposed within the housing. At least one counterweight gear that meshes with the gear teeth of the counterweight and the first set of gear teeth of the adjuster ring, and at least one bearing carriage gear that meshes with the gear teeth of the bearing carriage and the second set of gear teeth of the adjuster ring, so that movement of the adjuster ring causes movement of both the counterweight and the bearing carriage.

27 Claims, 30 Drawing Sheets

Related U.S. Application Data

(60) Provisional application No. 62/249,521, filed on Nov. 2, 2015, provisional application No. 62/340,335, filed on May 23, 2016.

(51) Int. Cl.
*B24B 23/04* (2006.01)
*F16C 3/28* (2006.01)
*F16C 19/06* (2006.01)

(58) Field of Classification Search
USPC .......................................... 451/357
See application file for complete search history.

(56) References Cited

U.S. PATENT DOCUMENTS

| | | | |
|---|---|---|---|
| 5,020,281 A | 6/1991 | Neff | |
| 5,947,804 A | 9/1999 | Fukinuki | |
| 6,062,960 A * | 5/2000 | Kai | B24B 23/03 |
| | | | 451/357 |
| 6,796,203 B2 | 9/2004 | Dubrowskij | |
| 10,144,106 B2 * | 12/2018 | McLain | B24B 23/02 |

FOREIGN PATENT DOCUMENTS

| | | |
|---|---|---|
| EP | 1 688 217 | 8/2006 |
| EP | 2 127 808 A1 | 12/2009 |
| GB | 2 420 518 | 5/2006 |
| JP | 2001 179591 | 7/2001 |
| WO | 99/21686 | 5/1999 |

* cited by examiner

ADJUSTABLE STROKE MECHANISM FOR RANDOM ORBITAL MACHINE

CROSS-REFERENCE TO RELATED APPLICATIONS

This application claims priority to U.S. Non-Provisional application Ser. No. 15/339,317, filed on Oct. 31, 2016, which claims priority to U.S. provisional application No. 62/249,521, filed on Nov. 2, 2015, and U.S. provisional application No. 62/340,335, filed on May 23, 2016, the entire contents of which are each hereby expressly incorporated by reference into this application.

BACKGROUND OF THE INVENTION

1. Field of the Invention

The present invention relates to a method and apparatus for adjusting the stroke on a random orbital machine, such as, but not limited to, polishing machines, sanding machines, and massaging machines. This adjustment ability allows a user to define the stroke of the random orbital machine and adjust it between a maximum definitive stroke setting and minimum zero orbit setting.

2. Discussion of the Related Art

Polishing machines and sanding machines are routinely used in the automotive detailing industry and home building industry to correct imperfections in the paint or drywall and to apply polishes and waxes. There are three primary machines used, including rotary buffers, random orbital machines, and dual action machines. Each tool has its place, as the manner in which the pad spins on each machine is unique and used for different purposes.

Rotary buffers are the fastest and most effective machine for removing paint defects in a controlled manner with good results. The drive unit used in a rotary buffer is directly connected to the pad and each one is in axial alignment with each other. In order to correct paint scratches, the rotary buffer is commonly used to remove enough paint surrounding the scratches to make the surface level. Removing scratches, however, requires more skill and control of the machine than a typical hobbyist possesses. For this reason, rotary buffers are commonly avoided by average users as it is very easy to remove too much paint and damage the finish by causing swirl marks or by burning the paint.

Random orbital machines were introduced in order to meet the needs of an average user, as they require less experience and control to operate. A random orbital machine uses a gear case that employs two unique mechanisms which move a pad attached to a backing plate. Unlike a rotary buffer, random orbital machines place the central rotational axis of the pad and the backing plate offset from the driveshaft of the machine. This offset is commonly referred to as the "stroke". As a result, the backing plate and pad orbit the driveshaft in a circular motion. At the same time, the pad randomly spins, as it is mounted on an idle bearing. This random spinning varies with pressure applied on the pad and is not directly powered. The result is a polishing action that will not burn or cut through the paint as it will not produce the heat from a powered spinning action. Random orbital machines are, therefore, much safer and dramatically less likely to cause swirls or burn through the paint.

Similar to random orbital machines, dual action machines place the central rotational axis of the pad and the backing plate offset from the driveshaft. As a result of this stroke, the backing plate and pad orbit the driveshaft in a circular motion. However, with a dual action machine the spinning of the pad is directly powered.

At the heart of a random orbital machine is the machine's stroke. The stroke is determined by the offset between the driveshaft axis and the backing axis. A longer offset or stroke places the backing plate rotational axis farther away from the driveshaft axis. Multiplying the offset by two produces the stroke diameter. The "stroke" is, therefore, a term that identifies the diameter of the path the backing plate travels as it orbits around the driveshaft.

A majority of random orbital machines are small stroke machines, which mean they use a stroke length that measures somewhere between approximately 6 mm-12 mm. A small stroke machine limits the movement of the pad to a smaller and tighter orbit. This results in a smoother action. A small stroke machine is also easier to control because the backing plate orbits around the driveshaft rotational axis in a tighter path. There are less vibrations and movement making the machine easier to hold due to the smoother action.

A large stroke machine delivers increased orbits per minute (OPM) of backing plate motion using the same rotations per minute (RPM), as the orbit of the backing plate and the pad around the drive shaft is increased. A large stroke also increases movement of the pad which helps spread out polishing compounds and treats a larger surface area. It also accomplishes more cutting action into the paint which allows for scratches and paint defects to be corrected. Small stroke machines typically only polish the paint and do not cut into it, and, therefore, are not able to remove surface defects.

One method of addressing the deficiencies of a small stroke has been to increase the RPM of the machine. While this increases the rotation of the motor, the machine stroke stays the same. There are also longevity issues associated with increased RPM for the motor and increased OPM for the pad. Increasing the RPM puts more strain on the motor, while increased OPM burns out a pad faster.

In sum, both long stroke and short stroke machines have their place in the industry. Therefore, what is needed is a machine that can be adjusted by the user without special tools or disassembly of the machine. Finally, what is needed is a compact, simple, and effective method to adjust the stroke of a machine based on the needs of the user.

SUMMARY OF THE INVENTION

A random orbital machine that includes an adjustable stroke mechanism defined by the user with a housing configured to mount the adjustable stroke mechanism to the random orbital machine.

In accordance with an embodiment of the invention, an adjustable stroke mechanism includes a housing having a circular wall enclosing a cavity. The wall includes a plurality of openings. The adjustable stroke mechanism also includes an adjuster disposed on an outer surface of the wall of the housing, a counterweight disposed within the housing, a bearing carriage disposed within the housing, and an adjustment mechanism configured to cause movement of the counterweight and bearing carriage in response to rotation of the adjuster. The counterweight and the bearing carriage each have an orifice formed therein.

According to an aspect of the invention, the adjuster is an adjuster ring surrounding an outer surface of the wall of the housing. The adjuster ring includes a first set of gear teeth along a first portion of an inner surface of the adjuster ring and a second set of gear teeth along a second portion of the inner surface of the adjuster ring. The adjustment means includes a set of gear teeth located along an exterior surface of the counterweight and at least one counterweight gear located between the counterweight and the adjuster ring and within one of the plurality of openings in the wall of the housing. The counterweight gear is configured to mesh with the first set of gear teeth of the adjuster ring and the set of gear teeth of the counterweight so that rotation of the adjuster ring causes movement of the counterweight. The adjustment means also includes a set of gear teeth disposed along an exterior surface of the bearing carriage and at least one bearing carriage gear located between the bearing carriage and the adjuster ring and within one of the plurality of apertures in the wall of the housing. The bearing carriage gear is configured to mesh with the second set of gear teeth of the adjuster ring and the set of gear teeth of the bearing carriage so that rotation of the adjuster ring causes movement of the bearing carriage.

According to another aspect of the invention, the adjuster is an adjuster knob disposed on an outer surface of the housing. The adjustment mechanism includes a drive gear with a set of gear teeth and being coupled to the adjuster knob in order to translate rotation of the adjuster knob to the drive gear, at least one idle gear with a set of gear teeth configured to mesh with the set of gear teeth of the drive gear, at least one counterweight screw gear with a set of gear teeth configured to mesh with the set of gear teeth of a respective one of the at least one idle gear, and at least one bearing carriage screw gear with a set of gear teeth configured to mesh with the set of gear teeth of a respective one of the at least one idle gear. The adjustment mechanism also includes at least one counterweight drive screw coupled to a respective counterweight screw gear and at least one bearing carriage drive screw coupled to a respective bearing carriage screw gear. Rotation of the drive gear causes rotation of the at least one idle gear, which causes rotation of the at least one counterweight screw gear, which causes rotation of the at least one counterweight drive screw, which causes movement of the counterweight. Rotation of the drive gear causes rotation of the at least one idle gear, which causes rotation of the at least one bearing carriage screw gear, which causes rotation of the at least one bearing carriage drive screw, which causes movement of the bearing carriage.

According to another embodiment of the invention, a method of adjusting a stroke of a random orbital machine includes coupling an adjustable stroke mechanism to a random orbital machine. The adjustable stroke mechanism includes a housing having a circular wall enclosing a cavity. The wall has a plurality of openings. The adjustable stroke mechanism also includes an adjuster located on an outer surface of the wall of the housing, a counterweight located within the cavity, a bearing carriage location within the cavity, and an adjustment mechanism located within the cavity. The method further includes rotating the adjuster, which causes the adjustment mechanism to rotate, which causes the counterweight to move and the bearing carriage to move.

In accordance with an aspect of the invention, the adjuster is an adjuster ring surrounding an outer surface of the wall of the housing. The adjuster ring includes a first set of gear teeth along a first portion of an inner surface of the adjuster ring and a second set of gear teeth along a second portion of the inner surface of the adjuster ring. The adjustment means includes a counterweight gear located between the counterweight and the adjuster ring and a bearing carriage gear located between the bearing carriage and the adjuster ring. The counterweight gear is configured to mesh with the first set of gear teeth of the adjuster ring and a set of gear teeth of the counterweight. The bearing carriage gear is configured to mesh with the second set of gear teeth of the adjuster ring and a set of gear teeth of the bearing carriage. Rotating the adjuster ring causes the counterweight gear to rotate, which causes the counterweight to move, and the causes the bearing carriage gear to rotate, which causes the bearing carriage to move.

According to another aspect of the invention, the adjuster is an adjuster knob located on an outer surface of the housing. The adjustment mechanism includes a drive gear disposed within the cavity and coupled to the adjuster knob in order to translate rotational motion of the adjuster knob to the drive gear, at least one idle gear disposed within the cavity and having a set of gear teeth configured to mesh with the set of gear teeth of the drive gear, at least one counterweight screw gear disposed within the cavity and having a set of gear teeth configured to mesh with the set of gear teeth of a respective idle gear, at least one bearing carriage screw gear disposed within the cavity and having a set of gear teeth configured to mesh with the set of gear teeth of a respective idle gear, at least one counterweight drive screw coupled to a respective counterweight screw gear, and at least one bearing carriage drive screw coupled to a respective bearing carriage screw gear. Rotating the adjuster knob causes rotation of the at least one idle gear, which causes rotation of the at least one counterweight screw drive, which causes movement of the counterweight. Rotation of the drive gear causes rotation of the at least one idle gear, which causes rotation of the at least one bearing carriage screw drive, which causes movement of the bearing carriage.

In accordance with yet another embodiment of the invention, an adjustable stroke mechanism includes a housing having a top plate, a bottom plate, and a wall extending between the top plate and the bottom plate and enclosing a cavity. The adjustable stroke mechanism also includes an adjuster located on an outer surface of the wall of the housing, a counterweight located within the cavity, a bearing carriage location within the cavity, and an adjustment mechanism located within the cavity. The adjustment mechanism is configured to cause movement of the counterweight and bearing carriage in response to rotation of the adjuster.

According to an aspect of the invention, the adjuster is an adjuster ring enclosing an outer surface of the wall of the housing. The adjuster ring includes a first set of gear teeth along a first portion of an inner surface of the adjuster ring and a second set of gear teeth along a second portion of the inner surface of the adjuster ring. The adjustment mechanism includes at least one counterweight gear disposed between the counterweight and the adjuster ring and within a first aperture in the wall of the housing. The at least one counterweight gear is configured to mesh with the first set of gear teeth of the adjuster ring and a set of gear teeth disposed along an exterior surface of the counterweight so that rotation of the adjuster ring causes movement of the counterweight. The adjustment mechanism also includes at least one bearing carriage gear disposed between the bearing carriage and the adjuster ring and within a second aperture in the wall of the housing. The at least one bearing carriage gear is configured to mesh with the second set of gear teeth of the adjuster ring and a set of gear teeth disposed along an exterior surface of the bearing carriage so that rotation of the adjuster ring causes movement of the bearing carriage.

In accordance with another aspect of the invention, the adjuster is an adjuster knob. The adjustment mechanism includes a drive gear having a set of gear teeth, at least one idle gear having a set of gear teeth configured to mesh with the set of gear teeth of the drive gear, at least one counterweight screw gear having a set of gear teeth configured to mesh with the set of gear teeth of a respective one of the at least one idle gear, at least one bearing carriage screw gear having a set of gear teeth configured to mesh with the set of gear teeth of a respective one of the at least one idle gear, at least one counterweight drive screw coupled to a respective one of the at least one counterweight screw gear, and at least one bearing carriage drive screw coupled to a respective one of the at least one bearing carriage screw gear. The drive gear is coupled to the adjuster knob to translate rotation of the adjuster knob to the drive gear. Rotation of the drive gear causes rotation of the at least one idle gear, which causes rotation of the at least one counterweight screw gear, which causes rotation of the at least one counterweight drive screw, which causes movement of the counterweight. Rotation of the drive gear causes rotation of the at least one idle gear, which causes rotation of the at least one bearing carriage screw gear, which causes rotation of the at least one bearing carriage drive screw, which causes movement of the bearing carriage.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
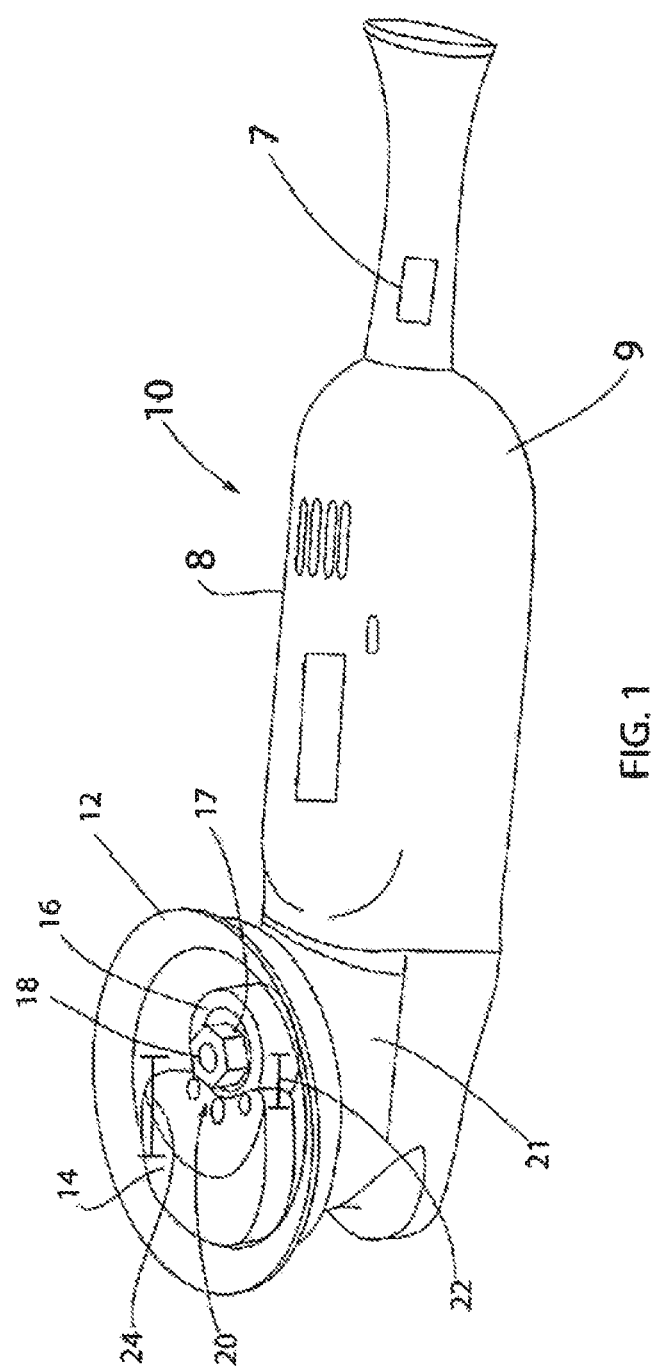
FIG. 1 is a raised perspective view of a known, prior art, random orbital machine.

In describing the preferred embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF PREFERRED EMBODIMENTS

The present invention and the various features and advantageous details thereof are explained more fully with reference to the non-limiting embodiments described in detail in the following description.

FIG. 1 depicts a known random orbital machine 10 with a conventional, fixed stroke. The random orbital machine 10 is operated by plugging in the power delivery device 9, which, in this case, is an electrical cord. The switch 7 may be depressed, which energizes the motor 8 that causes a driveshaft (not pictured) to rotate. A gear case 21 attaches to a shroud 12 and contains a counterweight 14 and backing plate mount 17 assembly.

The driveshaft has a rotational axis 20 which is offset from the backing plate axis 18. The backing plate mount 17 orbits about the driveshaft axis once for every revolution of the driveshaft. This is due to the offset which is measured by the stroke radius 22. The stroke diameter 24 is calculated by multiplying the stroke radius 22 by two, and this number is commonly used and referred to as the stroke of the random orbital machine 10. A backing plate bearing 16 allows the backing plate mount 17 to freely spin at random during the orbital action. In order to prevent substantial vibrations due to the stroke radius 22, a counterweight 14 is provided. The counterweight 14 is calculated to have a mass and center of mass that is offset from the driveshaft axis, which may be aligned or offset from the rotational axis 20 of the adjustment bar 34, such that it counteracts the vibrations caused due to the orbiting backing plate mount 17 and stroke radius 22. Each one of the rotating components of the random orbital machine 10 is located within a shroud 12 that prevents foreign bodies or the user's tinge (s) from damage during use.

Figure 2:
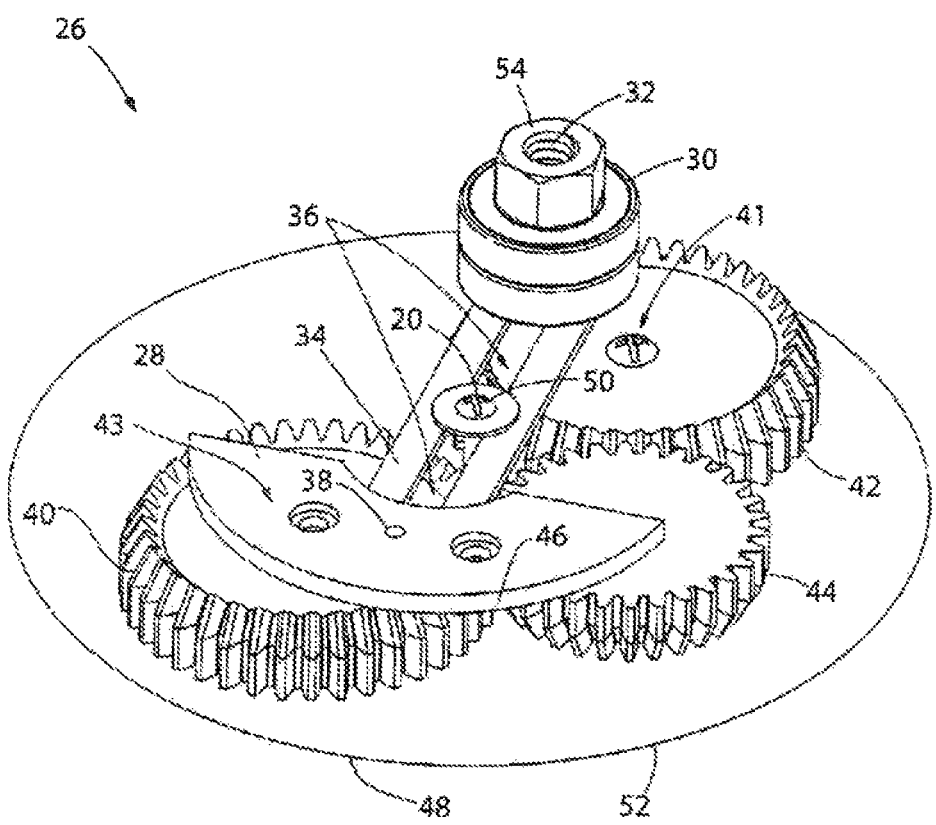
FIG. 2 is a raised perspective view of a first embodiment of an adjustable stroke mechanism for a random orbital machine showing an adjustable counterweight and adjustable backing plate mount.

Moving on to FIG. 2, a first embodiment of an adjustable stroke mechanism 26 is shown. The adjustable stroke mechanism 26 utilizes a series of gears to allow the backing plate mount 54 and counterweight 28 to automatically move toward or away from one another as any one of the gears is rotated. These synched movements of the backing plate mount 54 and the counterweight 28 allow the offset, or stroke, of a random orbital machine 10 to be adjusted while keeping vibrations in check. The offset may be adjusted between a maximum and min setting, or be adjustable by choosing a series of pre-selected settings.

A shroud will enclose the adjustable stroke mechanism 26 and is represented by a proposed shroud perimeter 48. The shroud would function much as the shroud 12 shown in FIG. 1 and will enclose the components of the adjustable stroke mechanism 26. The proposed shroud curvature 52 may also be matched to the counterweight curvature 46 such that the counterweight 28 will not intersect the proposed shroud perimeter 48 during operation.

The entire contents within the proposed shroud perimeter 48 rotate and are all intended to be placed within the shroud 12 much as shown in FIG. 1. For this reason, special care must be taken to ensure the counterweight 28 is always oriented in the proper direction and that its center of mass is always properly spaced from the backing plate axis 32 as the stroke is adjusted.

In order to adjust the stroke on the adjustable stroke mechanism 26, any one of a first gear 40, second gear 42, or idler gear 44 may be rotated. The first gear 40 meshes with the idler gear 44 and the idler gear 44 meshes with the second gear 42. The first gear 40 rotates about a first gear rotational axis 43 (at a central point of the first gear 40, which is obstructed from view) and the second gear 42 rotates about a second gear rotational axis 41. This rotation causes a subsequent rotation of any one of the gears, which causes all three gears to rotate. This rotational motion of the first gear 40 and second gear 42 is transferred to a movement of the counterweight 28 and backing plate mount 54, respectively. The rotational motion of the gears is transferred by not only the idler gear 44, but also by an adjustment bar 34. The adjustment bar 34 includes a groove 36 along its length. The backing plate mount 54 attaches to the second gear 42 through the groove 36 in the adjustment bar 34. A key 35, seen in FIG. 4, on the back of the counterweight 28 rides in the groove 36 of the adjustment bar 34 and ensures that the counterweight 28 is always oriented in the right direction to eliminate vibrations. The counterweight attachment point 38 passes through a bore 37 in the key 35 and allows the counterweight 28 to freely pivot about the counterweight attachment point 38.

Figure 3:
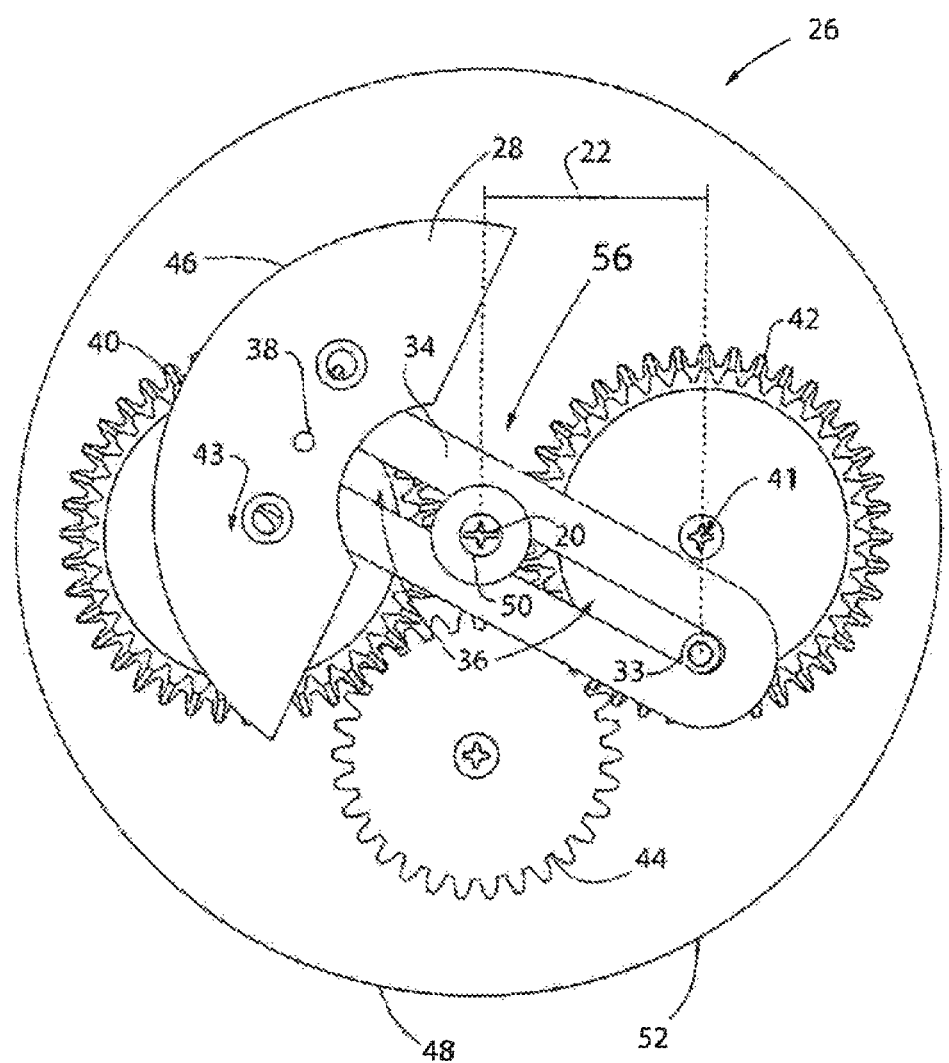
FIG. 3 is a top view of the adjustable stroke mechanism of FIG. 2 in a fully extended stroke position and with the backing plate mount removed.

FIG. 3 also shows a bearing 30 which allows the backing plate mount 54 to spin freely about a backing plate axis 32. When a backing plate is secured to the backing plate mount, a pad may be attached to the backing plate. The pad will then spin freely and randomly about the backing plate axis 32.

Figure 4:
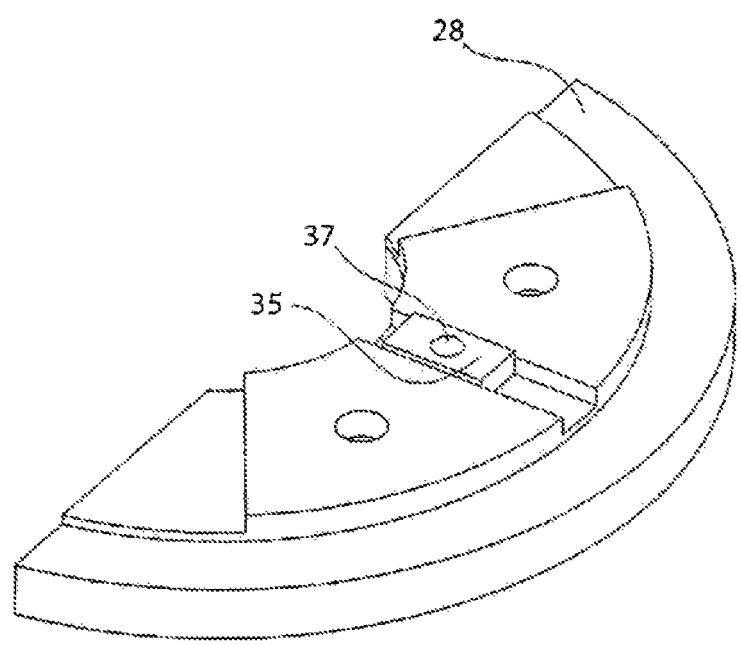
FIG. 4 is a bottom view of the counterweight of FIG. 2.

As the counterweight attachment point 38 is not in the center of the first gear 40, the counterweight attachment point 38 orbits around the center of the first gear 40 as the first gear 40 is rotated. This orbital motion pushes on the adjustment bar 34 and causes the backing plate mount 54 to also orbit around the center of the second gear 42. This happens because the backing plate mount 54 is fastened to the second gear 42, as shown in FIG. 3. The backing plate attachment point 33 passes through the groove 36 and pivots the adjustment bar 34 as the second gear 42 rotates. This motion causes the counterweight 28 to always remain aligned, as it pivots on the counterweight attachment point 38. The key 35, as shown in FIG. 4, rides in the groove 36. As a result, the counterweight 28 balances out the adjustable stroke mechanism 26 regardless of the stroke setting.

FIG. 3 shows a fully extended stroke 56. The backing plate attachment point 33 is adjusted such that the stroke radius 22 is fully extended. In this position, the backing plate attachment point 33 is fully extended to the end of the groove 36 in the adjustment bar 34. The adjustment bar attachment point 50 holds the adjustment bar 34 to the adjustable stroke mechanism 26, spaced above the first gear 40, second gear 42, and idler gear 44.

The counterweight 28 is also fully extended, and the key 35 is at the end of the groove 36 on the opposite side of the backing plate attachment point 33. The shape of the key 35 fits snugly in the groove 36 and maintains any point on the counterweight 28 facing the same point on the backing plate attachment point 33.

Figure 5:
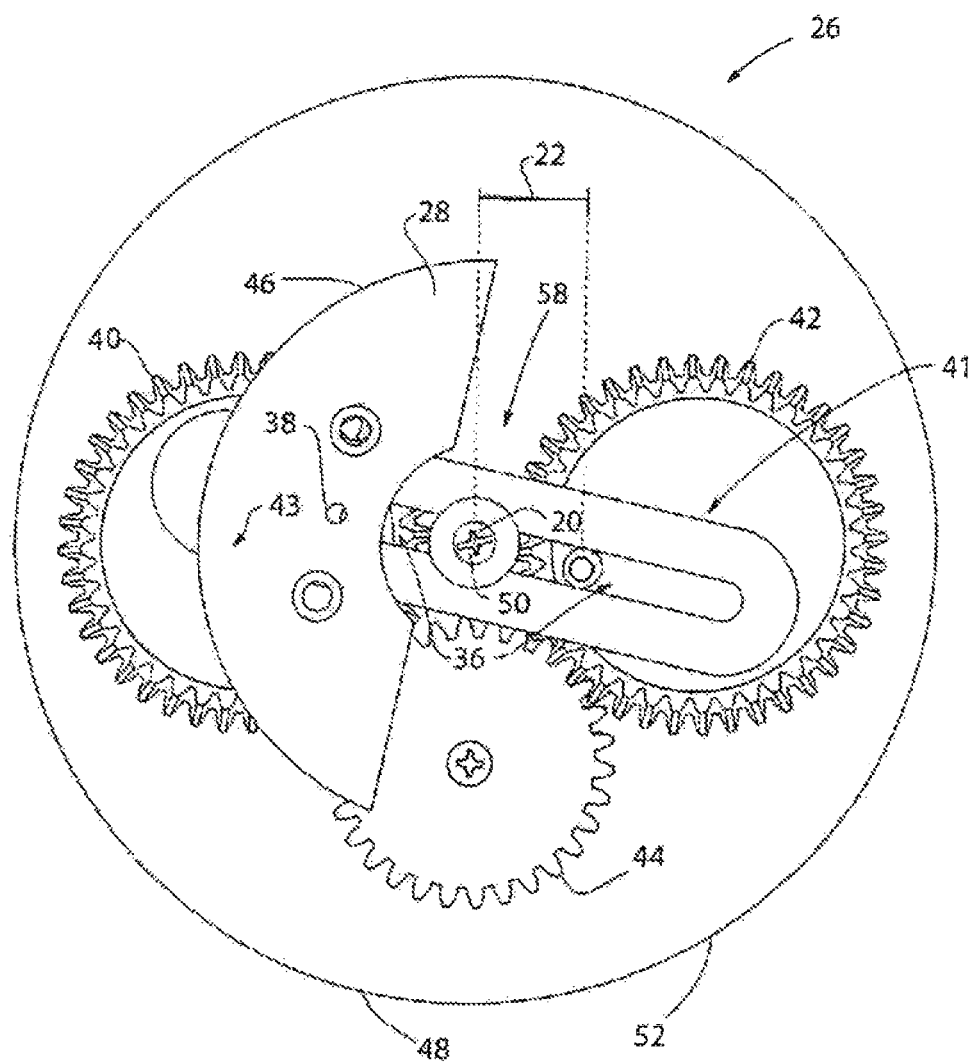
FIG. 5 is a top view of the adjustable stroke mechanism of FIG. 2 in a fully retracted stroke position and with the backing plate mount removed.

FIG. 5, for example, shows a fully retracted stroke 58. The stroke radius 23 in FIG. 5 is less than the stroke radius 22 in FIG. 3. This is due to rotation of any one of the first gear 40, second gear 42, and idler gear 44. The first gear 40 and the second gear 42 are preferably the same diameter. The backing plate attachment point 33 is also spaced away from the center of the second gear 42 the same distance as the counterweight attachment point 38 is spaced from the center for the first gear 40. This ensures that the counterweight 28 moves at the same rate as the backing plate mount 54 as any of the gears are rotated. This maintains proper balance despite changing the stroke length.

Figure 6:
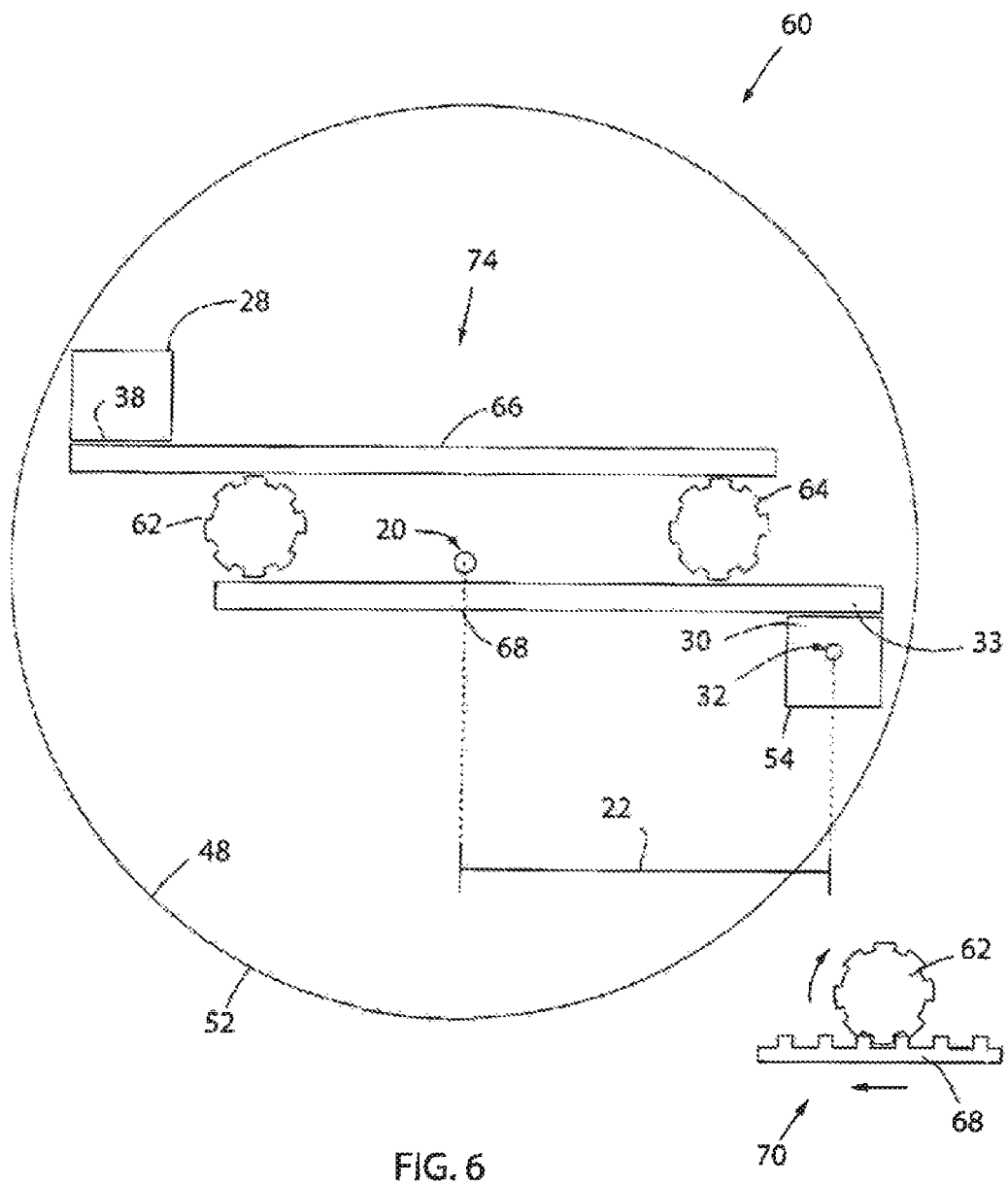
FIG. 6 is a top view of a second embodiment of an adjustable stroke mechanism for a random orbital machine shown in a fully extended stroke position.

Transitioning now to FIG. 6, a second embodiment of an adjustable stroke mechanism 60 is shown. The adjustable stroke mechanism 60 is represented within the perimeter of a shroud 48, similar to the known random orbital machine 10 in FIG. 1. The proposed shroud perimeter 48 also has a proposed shroud curvature 52 that houses the entire adjustable stroke mechanism 60. The entire adjustable stroke mechanism 60 rotates within the proposed shroud perimeter 48 when the random orbital machine 10 is activated by depressing the switch 7.

A fully extended stroke 74 is shown in FIG. 6. The stroke radius 22 is shown by the offset of the backing plate mount 54 to the rotational axis 20 of the backing plate mount 54. The counterweight 28 balances out the backing plate mount 54 such that minimal vibrations are experienced when the adjustable stroke mechanism 60 is activated.

The stroke radius 22 is adjusted by movement of a first rack gear 66, a second rack gear 68, a first pinion gear 62, and a second pinion gear 64. It is envisioned that a single pinion gear may also be used to adjust the stroke radius 22 as well. Both the first rack gear 66 and the second rack gear 68 have teeth along the length of the respective gears. The first pinion gear 62 and the second pinion gear 64 have corresponding and meshed teeth. As a result, when either one of the first pinion gears 62 and second pinion gears 64 are rotated, the first rack gear 66 and the second rack gear 68 also move in opposing directions. This motion is exemplified, for example, in the illustration 70. In the illustration 70, it is shown that as the second rack gear 68 moves to the left, the first pinion gear 62 rotates clockwise. Moving the first pinion gear 62 counter clockwise would cause the second rack gear 68 to move to the right.

As the counterweight 28 is secured to the first rack gear by a counterweight attachment point 38, and the backing plate mount 54 is secured to the second rack gear 68 with a backing plate attachment point 33, the stroke radius 22 may be easily adjusted. Also, as the stroke radius 22 is adjusted, the counterweight 28 is automatically kept at the desired distance from the rotational axis 20 to balance out the orbital motion of the backing plate mount 54.

Figure 7:
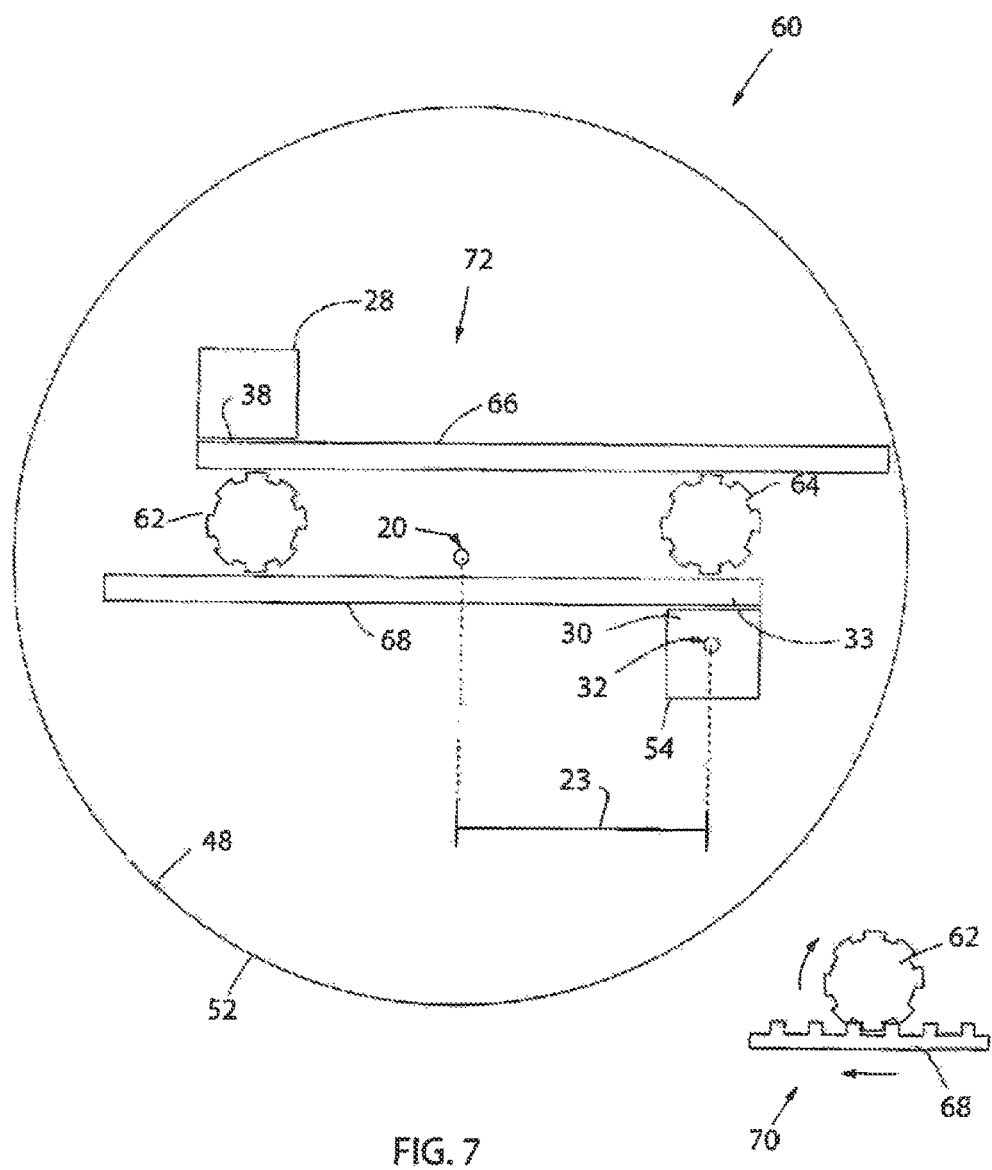
FIG. 7 is a top view of the adjustable stroke mechanism of FIG. 6 in a fully retracted stroke position.

FIG. 7 shows the fully retracted stroke 72. When the stroke is fully retracted, the stroke radius 23 is seen as shorter, as the offset between the backing plate axis 32 and the rotational axis 20 of the adjustable stroke mechanism 60 is lessened. Just as with respect to FIG. 2, the embodiment shown in FIG. 6 and FIG. 7 also has a bearing 30 to which the backing plate mount 54 is attached. The bearing 30 allows the backing plate mount to freely spin at random about the backing plate axis 32 as it orbits the rotational axis 20. Either one of the embodiments discussed herein also allows the stroke to be adjusted anywhere between the fully retracted 72 and fully extended strokes 74.

Figure 8:
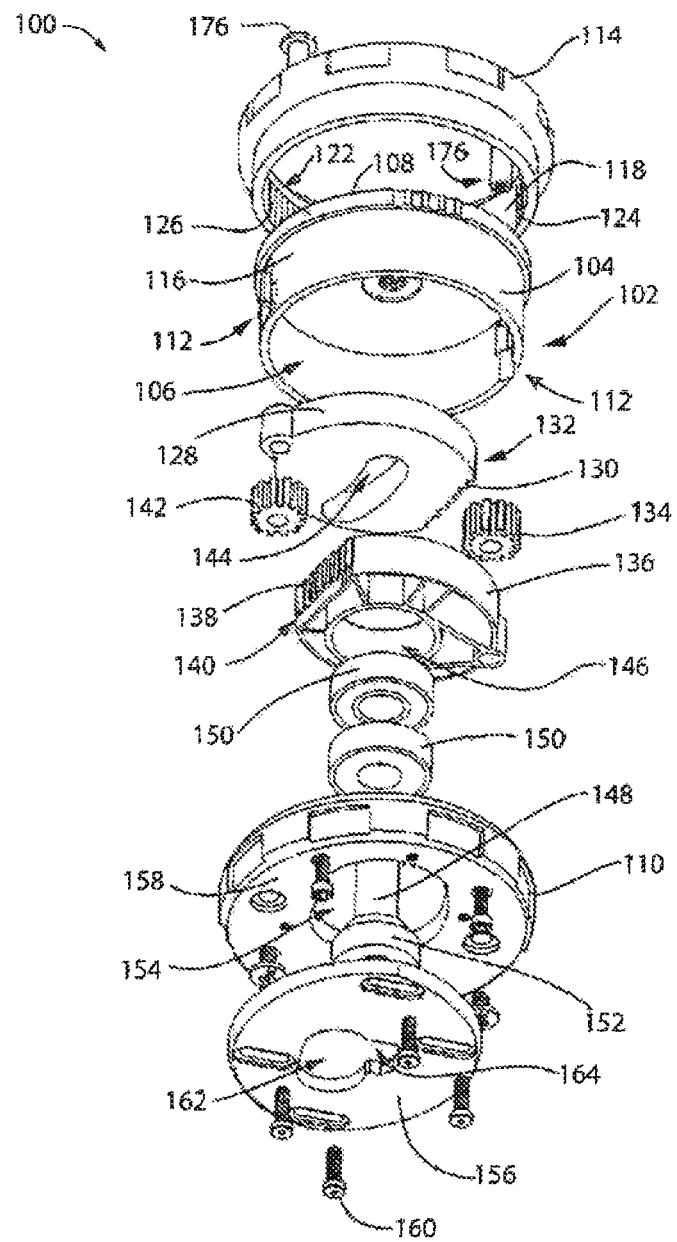
FIG. 8 is an exploded perspective view of a third embodiment of an adjustable stroke mechanism for a random orbital machine, according to the present invention.

Referring now to FIG. 8, a third embodiment of an adjustable stroke mechanism 100 is shown in an exploded perspective view in order to show the various components within the adjustable stroke mechanism 100. The adjustable stroke mechanism 100 includes a housing 102 having a wall 104 surrounding a cavity 106. As shown in FIG. 8, the wall 104 is depicted as circular in shape; however, the wall 104 could be in the form of any number of shapes. In addition, the housing 102 includes a top plate 108 oriented perpendicular to the wall 104, which provides an upper limit to the cavity 106. The housing 102 also includes a housing cover 110 oriented perpendicular to the wall 104 and opposite the top plate 108, which provides a lower limit to the cavity 106. The wall 104 of the housing 102 has a plurality of apertures 112 formed therein. While FIG. 8 shows two (2) apertures 112 formed in the wall 104, it is contemplated that either more or less than two (2) apertures 112 may be formed in the wall 104.

An adjuster ring 114 surrounds an outer surface 116 the wall 104 of the housing 102. An inner surface 118 of the adjuster ring 114 includes a first portion 120 and a second portion 122. A first set of gear teeth 124 is positioned along the first portion 120 of the inner surface 118 of the adjuster ring 114. Similarly, a second set of gear teeth 126 is positioned along the second portion 122 of the inner surface 118 of the adjuster ring 114. As shown in FIG. 8, the adjuster ring 114 and the housing 102 are aligned so that first and second sets of gear teeth 124, 126 line up with the plurality of apertures 112.

In one embodiment of the invention, the first and second sets of gear teeth 124, 126 are formed in the inner surface 118 of the adjuster ring 114; however, it is also contemplated that the first and second sets of gear teeth 124, 126 may be a separate piece attached to the inner surface 118 of the adjuster ring 114. Further, while FIG. 8 depicts the first and second portions 120, 122 as being only segments of the entire inner surface 118 of the adjuster ring 114, it is also contemplated that the first and second portions 120, 122 may cover the entire inner surface 118 of the adjuster ring 114. In turn, alternative embodiments of the invention may include first and second sets of gear teeth 124, 126 covering the entirety of the inner surface 118 of the adjuster ring 114.

As shown in FIG. 8, various additional components are placed with the cavity 106 of the housing 102. A counterweight 128 is disposed within the cavity 106 of the housing 102. The counterweight 128 includes a set of gear teeth 130 formed on an outer surface 132 of the counterweight 128. A counterweight drive gear 134 is placed between the counterweight 128 and the inner surface 118 of the adjuster ring 114. In particular, the counterweight drive gear 134 meshes with the first set of gear teeth 124 of the adjuster ring 114 and the set of gear teeth 130 of the counterweight 128. In addition, the counterweight drive gear 134 is configured to sit within one of the plurality of apertures 112 in the wall 104 of the housing 102. As such, rotation of the adjuster ring 114 results in movement of the counterweight 128 by way of rotation of the counterweight drive gear 134.

A bearing carriage 136 is also disposed within the cavity 106 of the housing 102. Similar to the counterweight 128, the bearing carriage 136 includes a set of gear teeth 138 formed on an outer surface 140 thereof. A bearing carriage drive gear 142 is placed between the bearing carriage 136 and the inner surface 118 of the adjuster ring 114. That is, the bearing carriage drive gear 142 meshes with the second set of gear teeth 126 of the adjuster ring 114 and the set of gear teeth 138 of the bearing carriage 136. Further, the bearing carriage drive gear 142 is configured to sit within another of the apertures 112 formed in the wall 104 of the housing 102. As a result, rotation of the adjuster ring 114 also results in movement of the bearing carriage 136 by way of rotation of the bearing carriage drive gear 142.

While FIG. 8 depicts the counterweight drive gear 134 as a single gear, it is contemplated that the counterweight drive gear 134 may be a plurality of gears configured to change the gear ratio between rotation of the adjuster ring 114 and movement of the counterweight 128. Likewise, in alternative embodiments of the invention, the bearing carriage drive gear 142 may be a plurality of gears configured to change the gear ratio between rotation of the adjuster ring 114 and movement of the bearing carriage 136.

The counterweight 128 and the bearing carriage 136 may also include a respective orifice 144, 146 formed therein. In this instance, a bearing axle 148 extends through both the orifice 144 of the counterweight 128 and the orifice 146 of the bearing carriage 136. Further, the bearing axle 148 is surrounded by at least one bearing 150, which is disposed within the orifice 146 of the bearing carriage 136. The bearing axle 148 also includes a backing plate mount 152, which extends out of the cavity 106 through an orifice 154 formed in the housing cover 110. The backing plate mount 152 is configured in such a way as to allow attachment to a tool, such as, but not limited to, a buffing pad.

During operation of the adjuster ring 114, the bearing axle 148 moves with the bearing carriage 136. As such, the orifice 144 formed in the counterweight 128 is configured to allow the bearing axle 148 to move with the bearing carriage 136, as the counterweight 128 itself moves in a different direction.

In certain embodiments of the invention, the adjustable stroke mechanism 100 may include a locking plate 156. The locking plate 156 may be secured to an outer surface 158 of the housing cover 110 via a plurality of fasteners 160, such as, but not limited to, screws. While FIG. 8 depicts the use of four (4) fasteners 160, one skilled in the art would readily recognize that more or less than four (4) fasteners 160 may be used to secure the locking plate 156 to the housing cover 110. The locking plate 156 has an orifice 162 formed therein, which is configured to have the backing plate mount 152 disposed within the orifice 162. The locking plate 156 is configured to be transitionable between an unlocked position 192 and a locked position 191. In the unlocked position 192, the adjuster ring 114 is able to be rotated, and, therefore, the bearing axle 148 is able to be moved between a number of predetermined positions to adjust the stroke. In the locked position 191, a notch 164 in the orifice 162 engages the backing plate mount 152, which prevents movement of the backing plate mount 152. In turn, this prevents movement of the bearing axle 148, which prevents movement of the bearing carriage 136, which, in turn, prevents movement of the adjuster ring 114.

Figure 9:
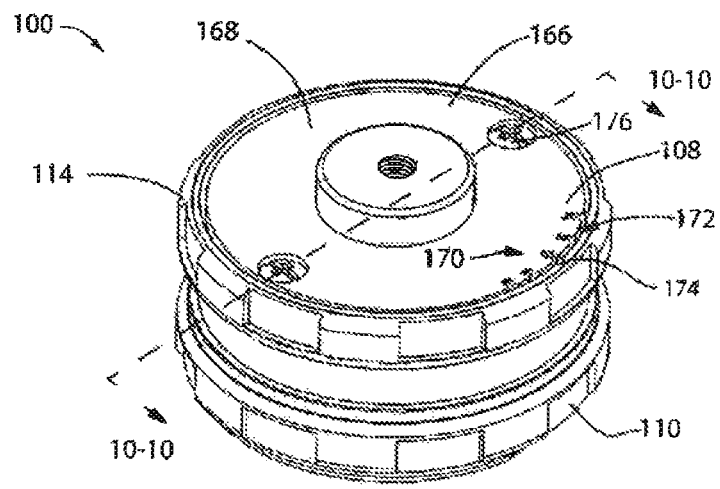
FIG. 9 is a perspective view of the adjustable stroke mechanism of a random orbital machine of FIG. 8.

FIG. 9 illustrates a perspective view of the adjustable stroke mechanism 100 completely assembled. According to an embodiment of the invention, a mount 166 is formed on the outer surface 168 of the top plate 108 of the housing 102. In particular, the mount 166 is configured to interact with a random orbital machine, in order to attach the adjustable stroke mechanism 100 to the random orbital machine, in one embodiment of the invention, the mechanism 100 is housed within a shroud of the random orbital machine, similar to the shroud 12 shown in FIG. 1.

In alternative embodiments of the invention, the shroud may include a plurality of lights, such as LEDs, to illuminate the working surface for a user, in addition, the random orbital machine may also include a temperature sensor, such as an infrared temperature sensor, and/or a gloss meter in order to track the temperature and/or the reflection gloss of the working surface. It is contemplated that the addition of a plurality of lights and a temperature sensor such as described above can be included in any of the embodiments of the invention.

FIG. 9 further shows markings 170 indicating the predetermined rotation locations of the adjuster ring 114. In one embodiment of the invention, the markings 170 correspond to indentions 172 along the circumference of the top plate 108 of the housing 102. Further, the adjuster ring 114 includes a detent 174 which interacts with a respective one of the indentations 172 as the adjuster ring 114 is rotated between predetermined positions. As a result, a user is given feedback regarding positioning of the stroke mechanism 100 in a predetermined position. This feedback may be tactile, audible, or both as a result of the detent 174 interacting with one of the indentations 172.

Figure 10:
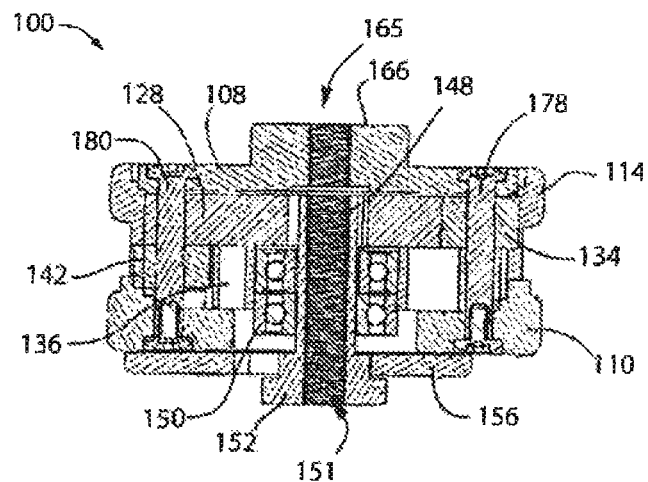
FIG. 10 is a side sectional view taken along line 10-10 of the adjustable stroke mechanism of a random orbital machine of FIG. 9.

Next, FIG. 10 illustrates a cross-sectional view of FIG. 9 taken along line 10-10. This view illustrates the relationship of parts within the cavity 106, as described above. In addition, the housing 102 and the housing cover 110 are coupled to each other by a plurality of fasteners 176, such as but not limited to the screws shown in the figures. In addition, fasteners 176 provide a pivot axle for certain components 128, 134, 136, 142 of the stroke mechanism 100 and help maintain the alignment of these components 128, 134, 136, 142.

For example, a first fastener 178 of the plurality of fasteners 176 acts as a pivot point for the bearing carriage 136 and an axis of rotation for the counterweight drive gear 134. Meanwhile, a second fastener 180 of the plurality of fasteners 176 acts as a pivot point for the counterweight 128 and an axis of rotation for the bearing carriage drive gear 142. In alternative embodiments, it is contemplated that a separate fastener may be used for each pivot point and axis of rotation.

As shown in FIG. 10, an inner thread 165 may be disposed within the mount 166, in order to assist with coupling the adjustable stroke mechanism 100 to the random orbital machine. However, it is contemplated that other coupling means may be used in place of the inner thread 165. Additionally, FIG. 10 shows an inner thread 151 disposed within the backing plate mount 152, in order to assist with coupling the adjustable stroke mechanism 100 to a tool. It is also contemplated that other coupling means may be used in place of the inner thread 151.

Figure 11:
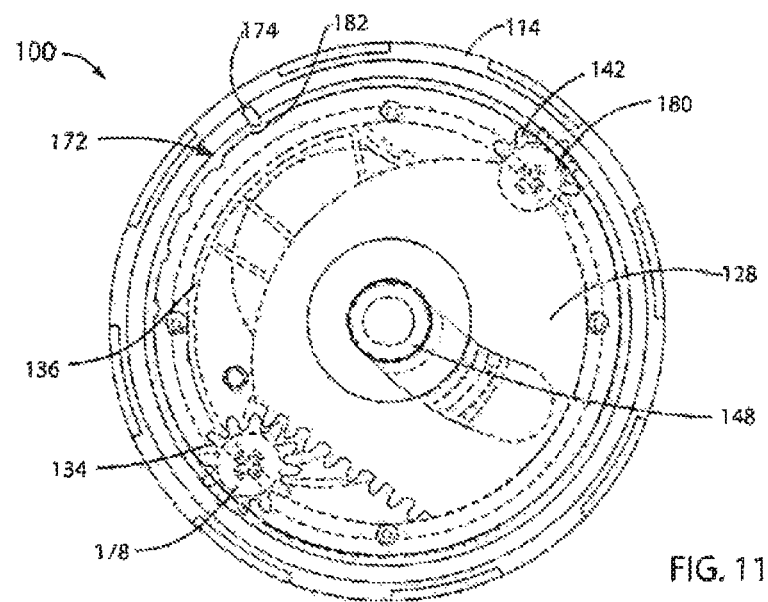
FIG. 11 is a top view of the adjustable stroke mechanism of FIG. 9 in a first position.
Figure 12:
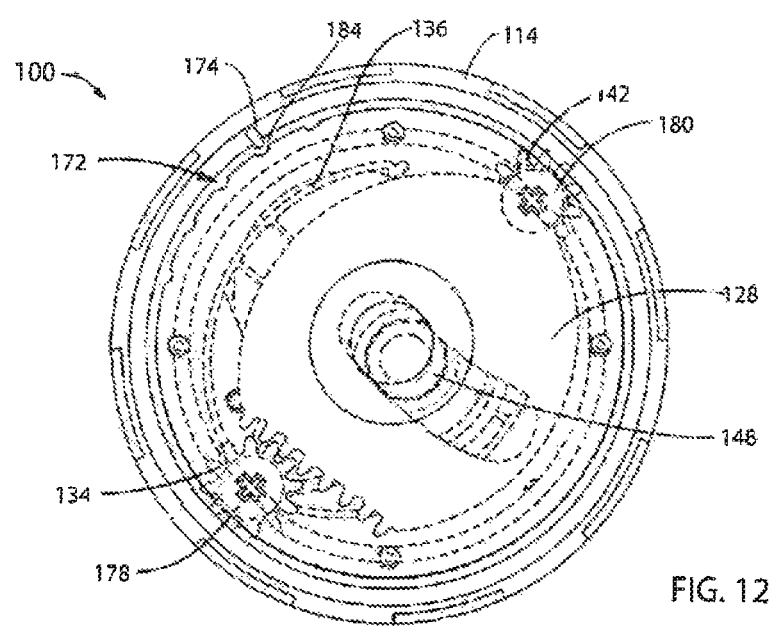
FIG. 12 is a top view of the adjustable stroke mechanism of FIG. 9 in a second position.
Figure 13:
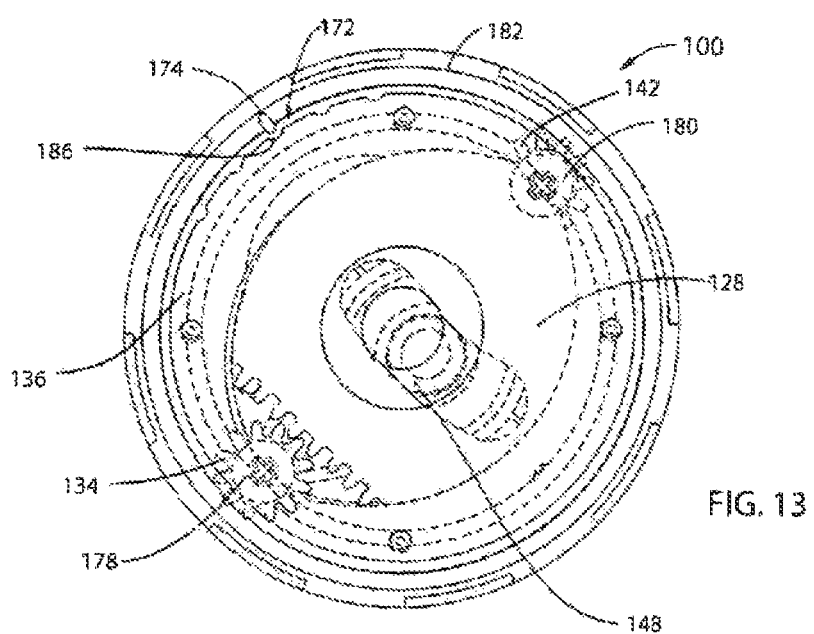
FIG. 13 is a top view of the adjustable stroke mechanism of FIG. 9 in a third position.
Figure 14:
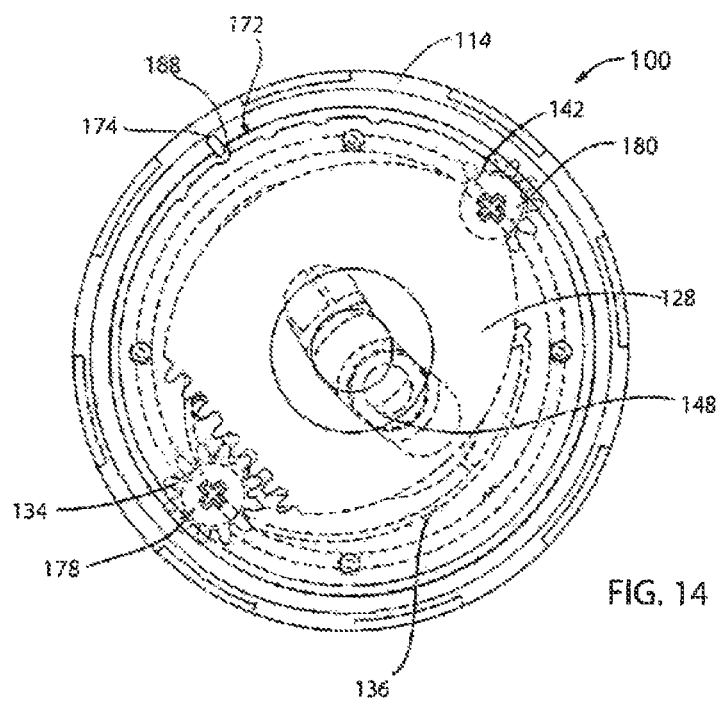
FIG. 14 is a top view of the adjustable stroke mechanism of FIG. 9 in a fourth position.
Figure 15:
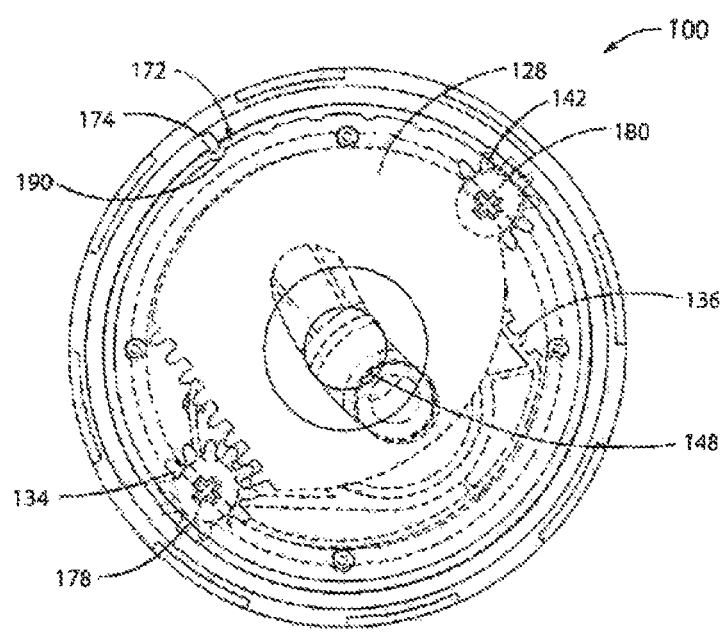
FIG. 15 is a top view of the adjustable stroke mechanism of FIG. 9 in a fifth position.

FIGS. 11-15 show a top view of the adjustable stroke mechanism 100 in a plurality of predetermined locations. The combination of figures illustrates the movement of the counterweight 128 and the movement of the bearing carriage 136 and bearing axle 148 as the adjuster ring 114 is rotated, resulting in a change in stroke. As seen in FIG. 11, the detent 174 is engaged in a first indentation 182 of the plurality of indentations 172 to signify that the adjuster ring 114 is in a first position. FIG. 12 shows the detent 174 engaged in a second indentation 184 of the plurality of indentations 172 to signify that the adjuster ring 114 is in a second position. FIG. 13 depicts the detent 174 engaged in a third indentation 186 of the plurality of indentations 172 to signify that adjuster ring 114 is in a third position. FIG. 14 shows the detent 174 engaged in a fourth indentation 188 of the plurality of indentations 172 to signify that the adjuster ring 114 is in a fourth position. FIG. 15 illustrates the detent 174 engaged in a fifth indentation 190 to signify that the adjuster ring 114 is in a fifth position.

While the figures depict five (5) indentations 172 to signify five (5) predetermined positions of the adjuster ring 114, it is contemplated that more or less than five (5)

indentations 172 may be used to signify more or less than five (5) predetermined positions of the adjuster ring 114.

Figure 16:
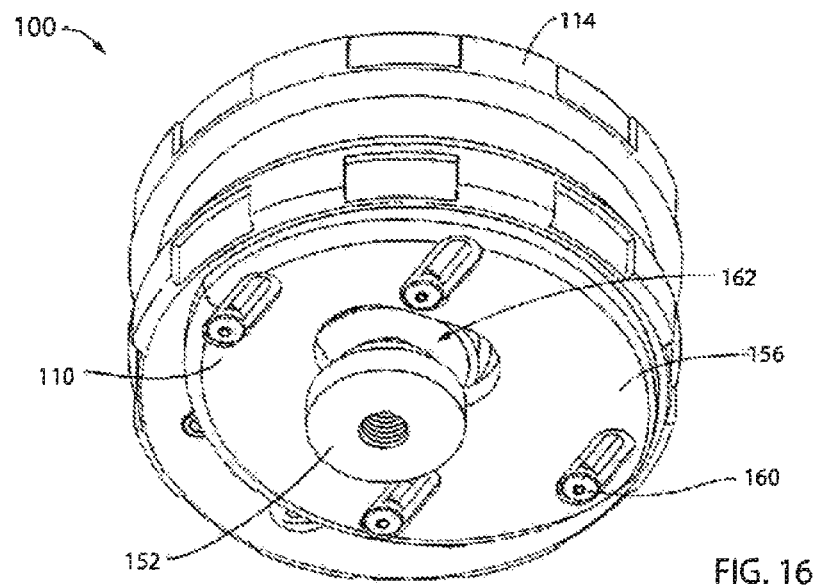
FIG. 16 is a bottom perspective view of the adjustable stroke mechanism of FIG. 9 in a first position with the locking plate in a locked position.
Figure 17:
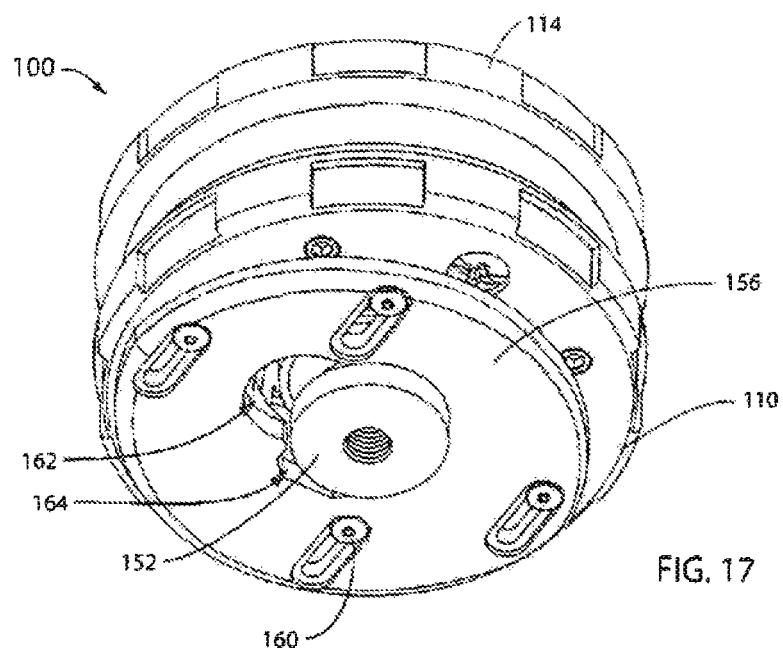
FIG. 17 is a bottom perspective view of the adjustable stroke mechanism of FIG. 9 in a first position with a locking plate in an unlocked position.
Figure 18:
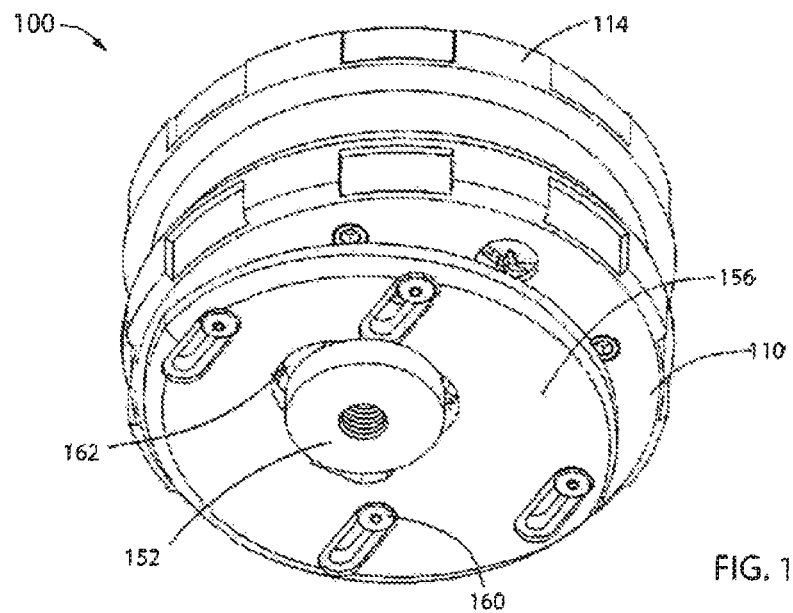
FIG. 18 is a bottom perspective view of the adjustable stroke mechanism of FIG. 9 in a second position.
Figure 19:
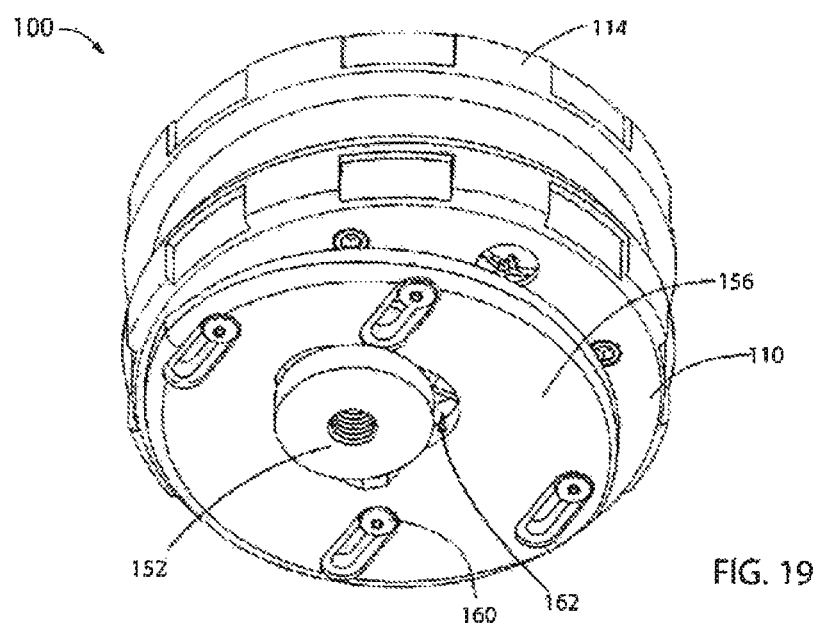
FIG. 19 is a bottom perspective view of the adjustable stroke mechanism of FIG. 9 in a third position.
Figure 20:
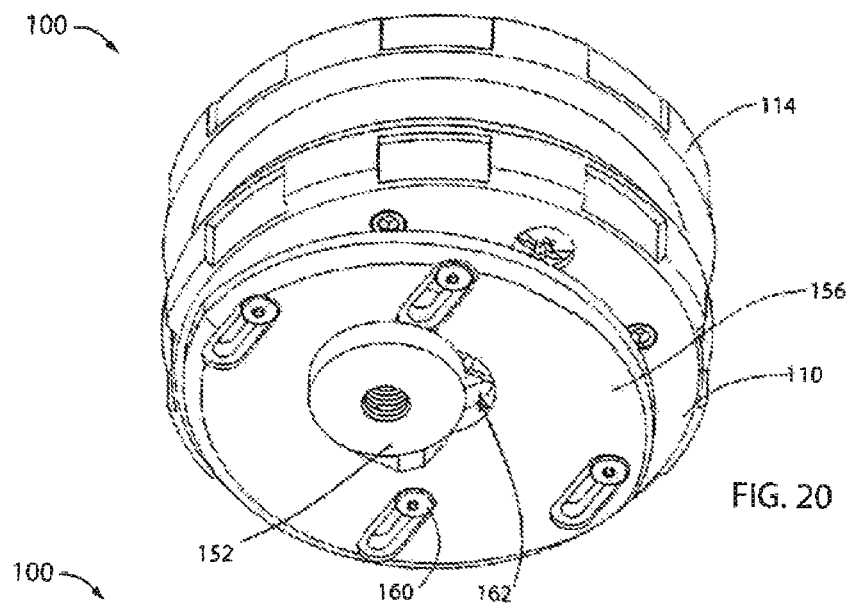
FIG. 20 is a bottom perspective view of the adjustable stroke mechanism of FIG. 9 in a fourth position.
Figure 21:
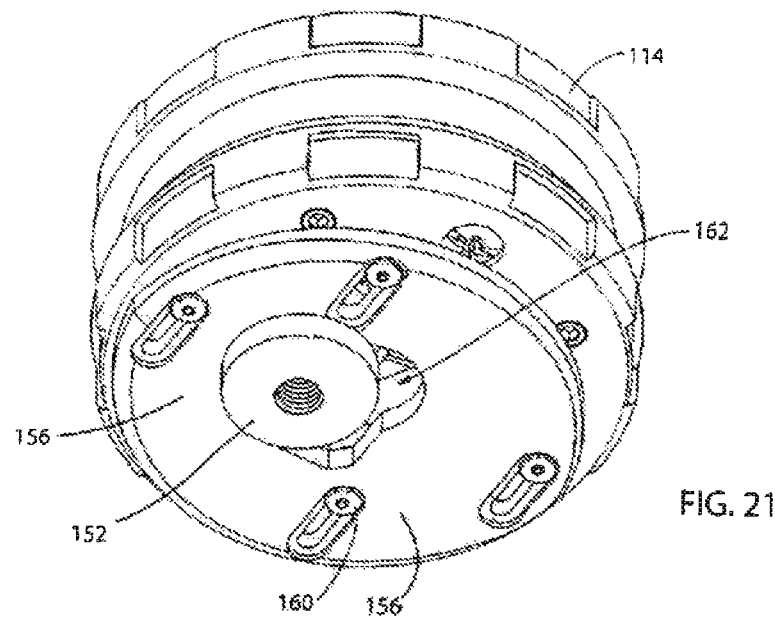
FIG. 21 is a bottom perspective view of the adjustable stroke mechanism of FIG. 9 in a fifth position.

FIG. 16 illustrates a bottom perspective view of the stroke mechanism 100 in the first position and also with the locking plate 156 in the locked position 191. As described above, the orifice 162 contains a notch 164, which, when in the located position, engages the backing plate mount 152 to prevent movement of the bearing axle 148 and the bearing carriage 136, and, as a result, prevents movement of the adjuster ring 114.

FIGS. 17-21 show a bottom perspective view of the stroke mechanism 100 in a number of predetermined locations with the locking plate 156 in the unlocked position 192. The combination of figures illustrates the movement of the bearing axle 148 as the adjuster ring 114 is rotated, resulting in a change in the stroke.

Figure 22:
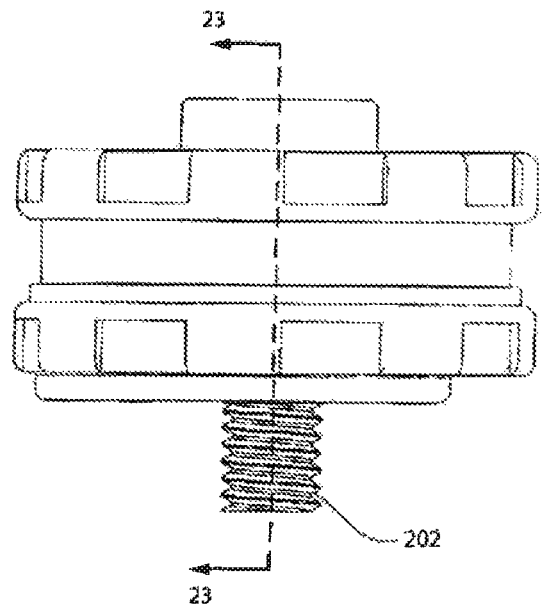
FIG. 22 is a side view of an adjustable stroke mechanism, according to an alternative embodiment of the invention.
Figure 23:
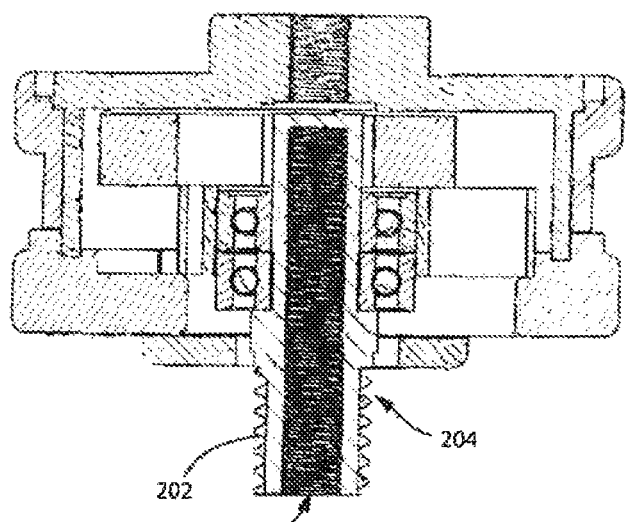
FIG. 23 is a cross-sectional view of a bearing axle of the adjustable stroke mechanism of FIG. 22 taken along line 23-23.

FIG. 22 illustrates a side view of a stroke mechanism 200, according to an alternative embodiment of the invention. In this embodiment of the invention, the backing plate mount 152 is replaced with a backing plate mount 202. A cross-sectional view of the backing plate mount 202 is shown in FIG. 23. As depicted in FIG. 23, the backing plate mount 202 includes an outer thread 204 and an inner thread 206. As such, the backing plate mount 202 is able to interfit with a variety of backing plate sizes.

Figure 24:
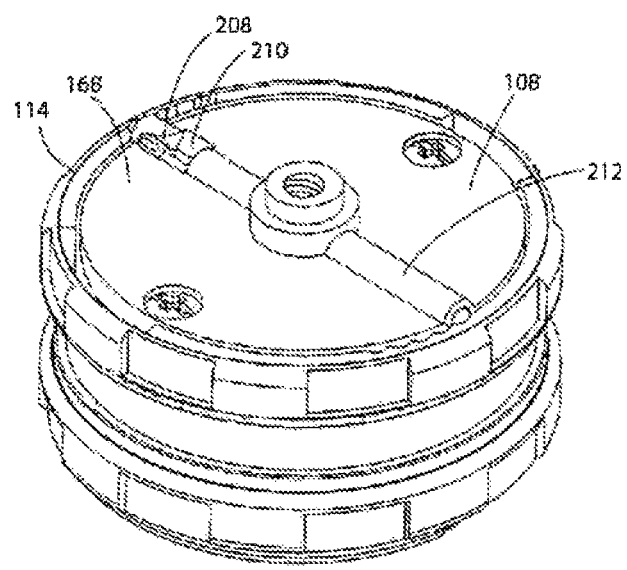
FIG. 24 is a top perspective view of an adjustable stroke mechanism, according to an alternative embodiment of the invention.

FIG. 24 illustrates a top perspective view of a stroke mechanism 208, according to an alternative embodiment of the invention. In this embodiment of the invention, the plurality of indentations 172 of the housing 102 is replaced with a locking pin 210. Additionally, the detent 174 of the adjuster ring is replaced with a plurality of indentations 212, similar to the plurality of indentations 172 shown in FIG. 3. That is, the locking pin 210 is configured to interfit when a respective one of the plurality of indentations 212 when in a locked position. On the other hand, when the locking pin 210 is in an unlocked position, the adjuster ring 114 is able to be rotated. The locking pin 210 includes a spring 214 configured to maintain the locking pin 210 in the locked position unless the locking pin 210 is manually moved to and maintained in the unlocked position by a user.

In the representative embodiment of the invention, a covered channel 216 is formed in the outer surface 168 of the top plate 108 of the housing 102. The locking pin 210 and the spring 214 are housed within the covered channel 216. While FIG. 24 shows the covered channel 216 along the entire length of the outer surface 168 of the top plate 108, it is contemplated that the covered channel 216 may exists along any distance along the outer surface 168 of the top plate 108.

Figure 25:
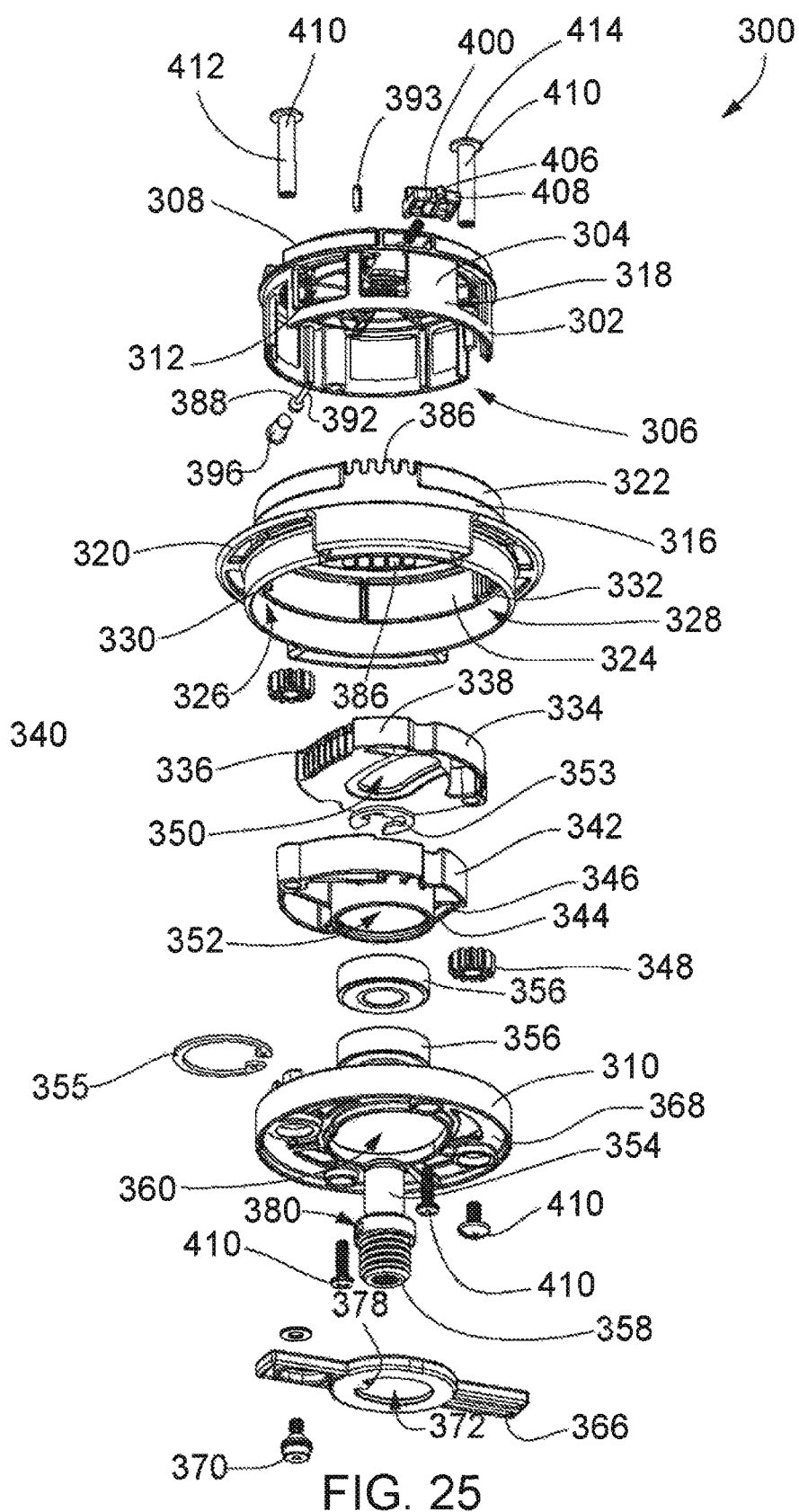
FIG. 25 is exploded perspective view of a fourth embodiment of an adjustable stroke mechanism for a random orbital machine, according to the present invention.

Referring now to FIG. 25, an adjustable stroke mechanism 300 is shown in an exploded perspective view in order to show the various components within the adjustable stroke mechanism 300, according to a fourth embodiment of the invention. The adjustable stroke mechanism 300 includes a housing 302 having a wall 304 surrounding a cavity 306. In the representative embodiment of the invention, the wall 304 is depicted as circular in shape, but may be in the form of any number of shapes in other embodiments of the invention. In addition, the housing 302 includes a top plate 308 oriented perpendicular to the wall 304 and providing an upper limit to the cavity 306. The housing 302 also includes a bottom plate 310 oriented perpendicular to the wall 304 and opposite the top plate 308. The bottom plate 310 provides a lower limit to the cavity 306. The wall 304 includes a number of apertures 312 formed therein. In addition, the top plate 308 also includes a number of apertures 314 formed therein. It is contemplated that the wall 304 and the top plate 308 may include any number of apertures 312, 314, respectively, which may also reduce the weight of the adjustable stroke mechanism 300 and allow airflow therein.

An adjuster ring 316 surrounds an outer surface 318 of the wall 304 of the housing 302. The adjuster ring 316 further includes an adjuster grip 340 extending outward from an outer surface 322 of the adjuster ring 316. An inner surface 324 of the adjuster ring 316 includes a first portion 326 and a second portion 328. A first set of gear teeth 330 is positioned along the first portion 326 of the inner surface 324 of the adjuster ring 316, and a second set of gear teeth 332 is positioned along the second portion 328 of the inner surface 324 of the adjuster ring 316. As shown in FIG. 25, the adjuster ring 316 and the housing 302 are aligned so that the first and second sets of gear teeth 330, 332 are aligned with respective series of apertures 312 of the housing 302.

In representative embodiment of the invention, the first and second sets of gear teeth 330, 332 are formed in the inner surface 324 of the adjuster ring 316. In other embodiments of the invention, the first and second sets of gear teeth 330, 332 may be separate pieces attached to the inner surface 324 of the adjuster ring 316. Further, while FIG. 25 depicts the first and second portions 326, 328 of the inner surface 324 as being only segments of the entire inner surface 324 of the adjuster ring 316, it is also contemplated that the first and second portions 326, 328 may cover the entire inner surface 324 of the adjuster ring 316.

The adjustable stroke mechanism 300 includes various additional components that are placed within the cavity 306 of the housing 302. For instance, a counterweight 334 is disposed within the cavity 306 of the housing 302. The counterweight 334 includes a set of gear teeth 336 formed on an outer surface 338 of the counterweight 334. A counterweight drive gear 340 is disposed between the counterweight 334 and the inner surface 324 of the adjuster ring 316. Further, the counterweight drive gear 340 is configured to mesh with the first set of gear teeth 330 of the adjuster ring 316 while also meshing with the set of gear teeth 336 of the counterweight 334. The counterweight drive gear 340 is also configured to sit within one of the plurality of apertures 312 in the wall 304 of the housing 302. As a result of the above alignment, rotation of the adjuster ring 316 causes rotation of the counterweight drive gear 340, which results in movement of the counterweight 334.

The adjustable stroke mechanism 300 also includes a bearing carriage 342 disposed within the cavity 306 of the housing 302. Similar to the counterweight 334, the bearing carriage 342 includes a set of gear teeth 344 formed on an outer surface 346 thereof. A bearing carriage drive gear 348 is placed between the bearing carriage 342 and the inner surface 324 of the adjuster ring 316. Further, the bearing carriage drive gear 348 is configured to mesh with the second set of gear teeth 332 of the adjuster ring 316 while also meshing with the set of gear teeth 344 of the bearing carriage 342. In order to make contact with both the bearing carriage 342 and the inner surface 324 of the adjuster ring 316, the bearing carriage drive gear 348 is disposed in one of the aperture 312 formed in the wall 304 of the housing 302. As a result of the above described configuration, rotation of the adjuster ring 316 results in rotation of the bearing carriage drive gear 348, which results in movement of the bearing carriage 342.

While FIG. 25 depicts the counterweight drive gear 340 and the bearing carriage drive gear 348 as being single gear system, respectively, it is contemplated that in other embodiments of the invention one or both of the counterweight drive gear 340 and the bearing carriage drive gear 348 may comprise a multi-gear system configured to maintain or change the gear ratio between rotation of the adjuster ring 316 and movement of the counterweight 334 and the bearing carriage 342, respectively.

The counterweight 334 and the bearing carriage 342 may also include a respective orifice 350, 352 formed therein. In varying embodiments of the invention, the orifice 352 of the bearing carriage 342 extends through the entire thickness of the bearing carriage 342, and the orifice 350 of the counterweight 334 extend through the entire thickness of the counterweight 334 or less than the entire thickness of the counterweight 334 and be in the form of an indentation.

Figure 28:
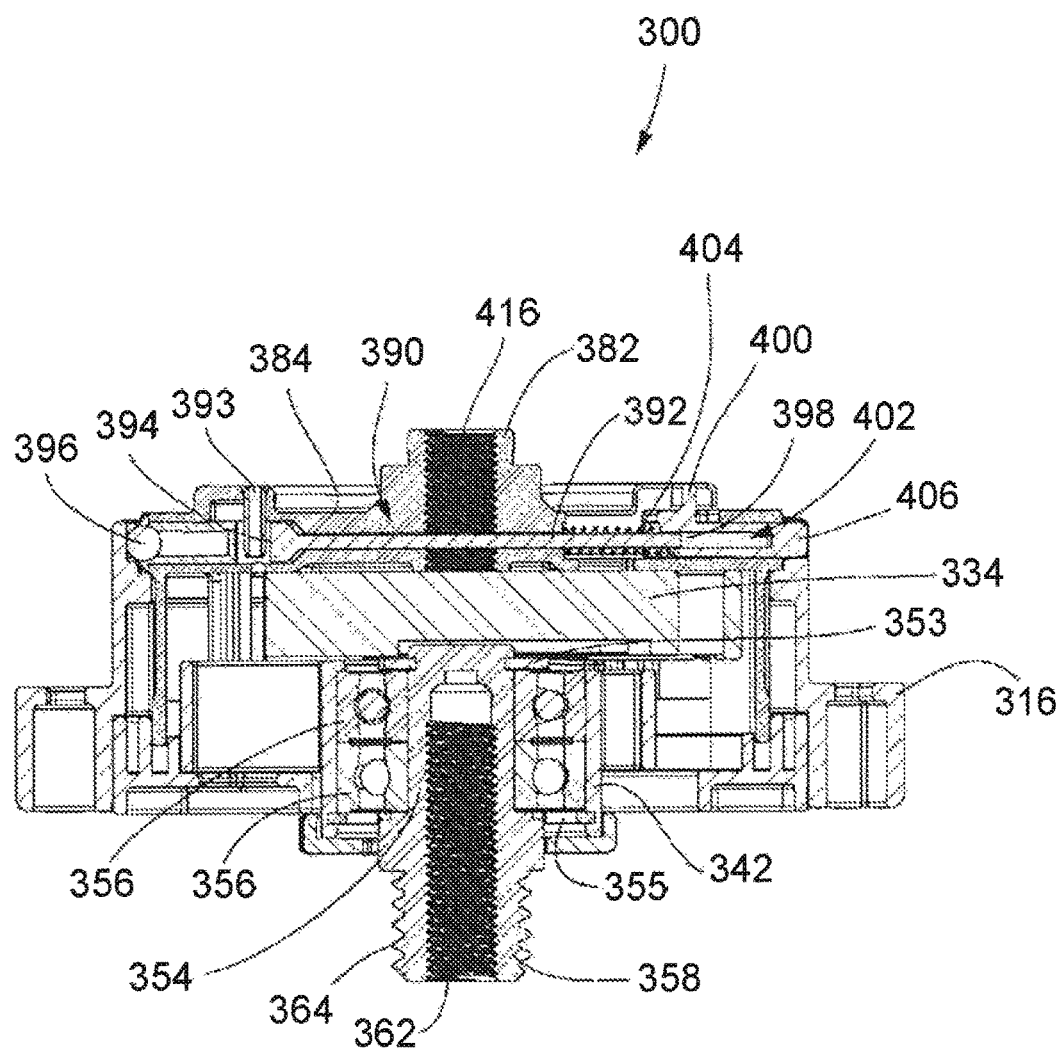
FIG. 28 is a first cross-sectional view of the adjustable stroke mechanism of FIG. 27 taken along line 28-28.
Figure 29:
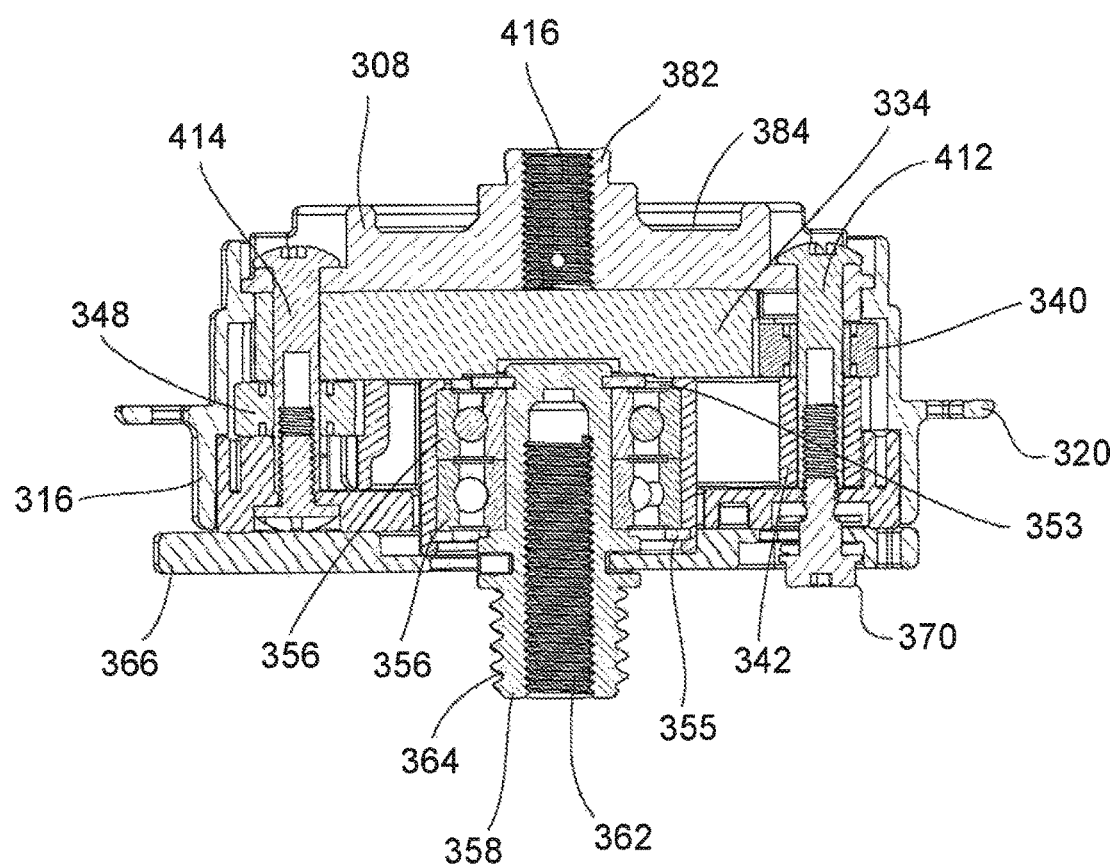
FIG. 29 is a second cross-sectional view of the adjustable stroke mechanism of FIG. 27 taken along line 29-29.

The adjustable stroke mechanism 300 includes a bearing axle 354 that extends through the orifice 352 of the bearing carriage 342 and into the indentation or orifice 350 of the counterweight 334. The bearing axle 354 may be surrounded by at least one bearing 356, which is disposed within the orifice 352 of the bearing carriage 342. While FIG. 25 depicts the use of two (2) bearing 356, other embodiments of the invention may use more or less than two (2) bearings 356. As also illustrated in FIGS. 28 and 29, which will be further described below, a first clip 353 is disposed around the bearing axle 354 above the bearings 356 and a second clip 355 is disposed around the bearing axle 354 below the bearings 356 in order to retain both the bearing axle 354 and the bearings 356 in their vertical alignment.

The bearing axle 354 includes a backing plate mount 358, which extends out of the cavity 306 of the housing 302 through an orifice 360 formed in the bottom plate 310 of the housing 302. As shown in the representative embodiment of the invention, the backing plate mount 358 includes inner threading 362 and outer threading 364 along the length of the backing plate mount 358 in order to allow for the attachment of tools, such as, but not limited to, a buffing pads of varying thread sizes. In other embodiments of the invention, the backing plate mount 358 may include inner threading 362 or outer threading 364, as opposed to both.

As the adjuster ring 316 is rotated and causes the bearing carriage 342 to move, the bearing axle 354 disposed within the orifice 352 of the bearing carriage 342 moves with the bearing carriage 342. As such, the orifice 350 of the counterweight 334 is shape to allow the bearing axle 354 shift within the orifice 350 and move with the bearing carriage 342, as the counterweight 334 moves in a different direction.

The adjustable stroke mechanism 300 may further include a locking plate 366 secured to an outer surface 368 of the bottom plate 310 by way of at least one fastener 370. While the representative embodiment depicts the use of one (1) fastener 370, other embodiments of the invention may use more than one (1) fastener 370 to secure the locking plate 366 to the outer surface 368 of the bottom plate 310. The locking plate 366 includes an orifice 372 formed therein, which is configured to receive the backing plate mount 358. The locking plate 366 is further configured to transition between an unlocked position 374 and a locked position 376. In the representative embodiment of the invention, the locking plate 366 is configured to slide between the unlocked position 374 and the locked position 376.

In the unlocked position 374, the backing plate mount 358 is allowed to be moved, which, in turn, allows movement of the bearing axle 354, bearing carriage 342, bearing carriage drive gear 348, counterweight 334, counterweight drive gear 340, and adjuster ring 316. As a result, the stroke of the mechanism 300 is able to be adjusted by the adjuster ring 316 when the locking plate 366 is in the unlocked position 374. In the locked position 376, the locking plate 366 interlocks with the backing plate mount 358 to prevent movement of the backing plate mount 358, which, in turn, prevents movement of the bearing axle 354, bearing carriage 342, bearing carriage drive gear 348, counterweight 334, counterweight drive gear 340, and adjuster ring 316. As a result, the stroke of the mechanism 300 is maintained when the locking plate 366 is in the locked position 376. In the representative embodiment of the invention, the locking plate 366 and the backing plate mount 358 are interlocked by way of a tab 378 formed in the locking plate 366 and configured to interfit with a slot 380 formed in the backing plate mount 358. Other configurations of interlocking the locking plate 366 and the backing plate mount 358 are contemplated in alternative embodiments of the invention.

Figure 26:
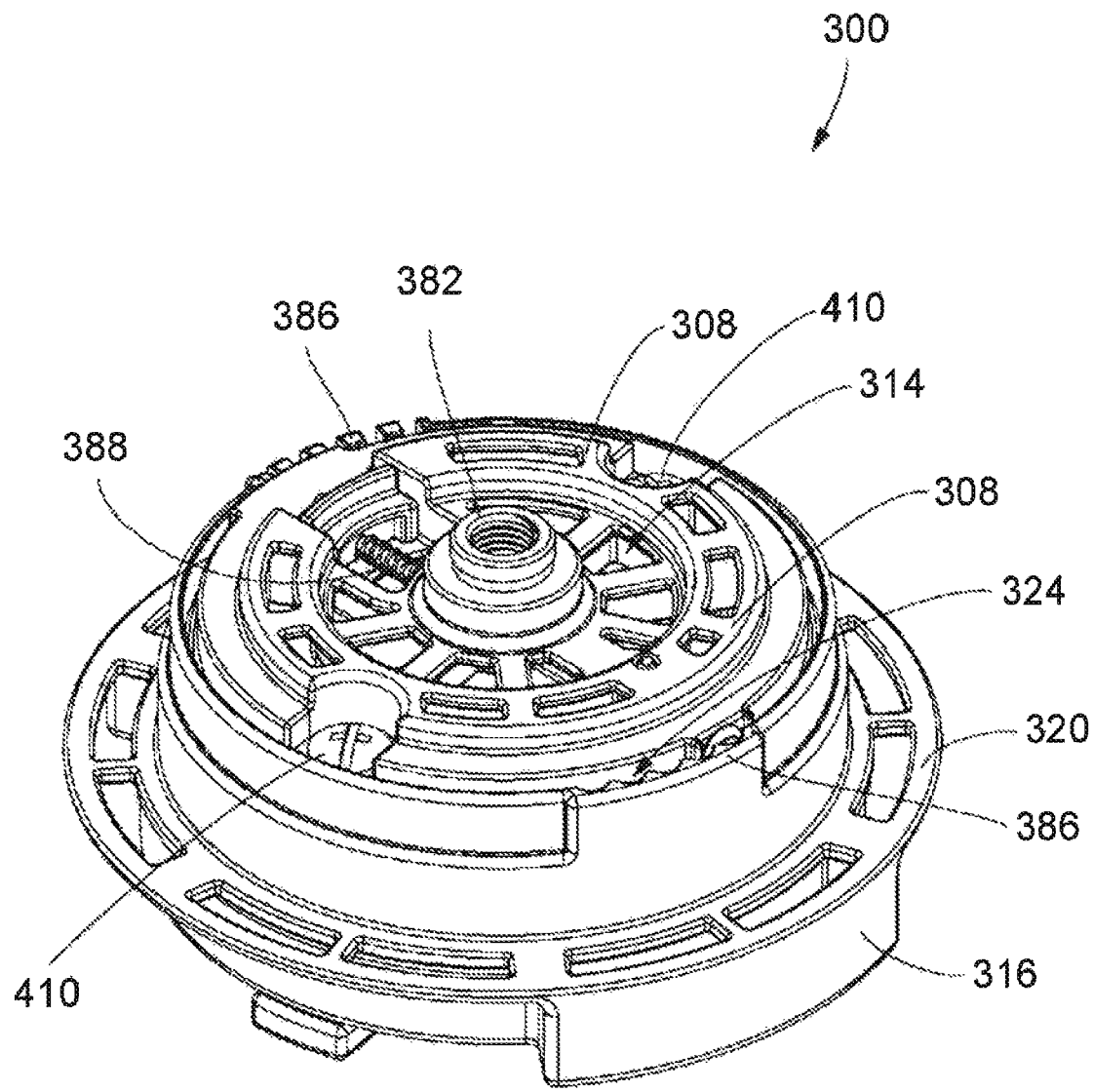
FIG. 26 is a perspective view of the adjustable stroke mechanism of a random orbital machine of FIG. 25.

FIG. 26 illustrates a perspective view of the adjustable stroke mechanism 300 completely assembled. According to the representative embodiment of the invention, a mount 382 is formed on an outer surface 384 of the top plate 308 of the housing 302. In particular, the mount 382 is configured to interact with a random orbital machine, in order to attach the adjustable stroke mechanism 300 to the random orbital machine. In one embodiment of, the mechanism 300 is housed within a shroud of the random orbital machine, similar to the shroud 12 shown in FIG. 1.

FIG. 26 further depicts a plurality of indentations 386 disposed along the inner surface 324 of the adjuster ring 316. Each of the plurality of indentations 386 may individually be either formed through the entire thickness of the adjuster ring 316 or less than the thickness of the adjuster ring 316. The housing 302 includes a locking pin 388 extending from one side of the housing wall 304 to another through a channel 390 formed in the plate 308 of the housing 302.

FIG. 28 shows the locking pin 388, which includes a pin element 392 that is disposed within the channel 390 of the top plate 308. A first end 394 of the pin element 392 is disposed within the channel 390 and adjacent a plunger element 396. The plunger element 396 is configured to interfit with a respective one of the plurality of indentations 386 formed in the inner surface 324 of the adjuster ring 316.

The representative embodiment of the invention depicts a split spring pin 393 disposed between the pin element 392 and the plunger element 396. The split spring pin 393 is configured to retain the pin element 392 and the plunger element 396 in their positions during use of the mechanism 300. Other embodiments of the invention may include other mechanisms for retaining the pin and plunger elements 392, 396. Further embodiments of the invention may simply couple the plunger element 396 to the first end 394 of the pin element 392.

A second end 398 of the pin element 392 is configured to interfit with a pin lock 400. In the representative embodiment of the invention, the pin lock 400 includes an orifice 402 formed therein to receive the second end 398 of the pin element 392. A spring 404 is disposed along a portion of the pin element 392 adjacent the pin lock 400. The spring 404 is configured to provide tension on the locking pin 388 so that it rests in a locked position.

In the representative embodiment of the invention, the pin lock 400 includes a detent 406 disposed on the outer edge 408 thereof adjacent a respective one of the plurality of indentations 386. A user is able to manipulate the pin lock 400 in order to transfer the locking pin 388 from a locked position to an unlocked position. For example, FIG. 26 illustrates the locked position in which the detent 406 is interfit with one of the plurality of indentations 386. To transfer the locking pin 388 into the unlocked position, the pin lock 400 is pushed away from the adjuster ring 316 so that the detent 406 of pin lock 400 is spaced apart from the plurality of indentations 386.

Figure 27:
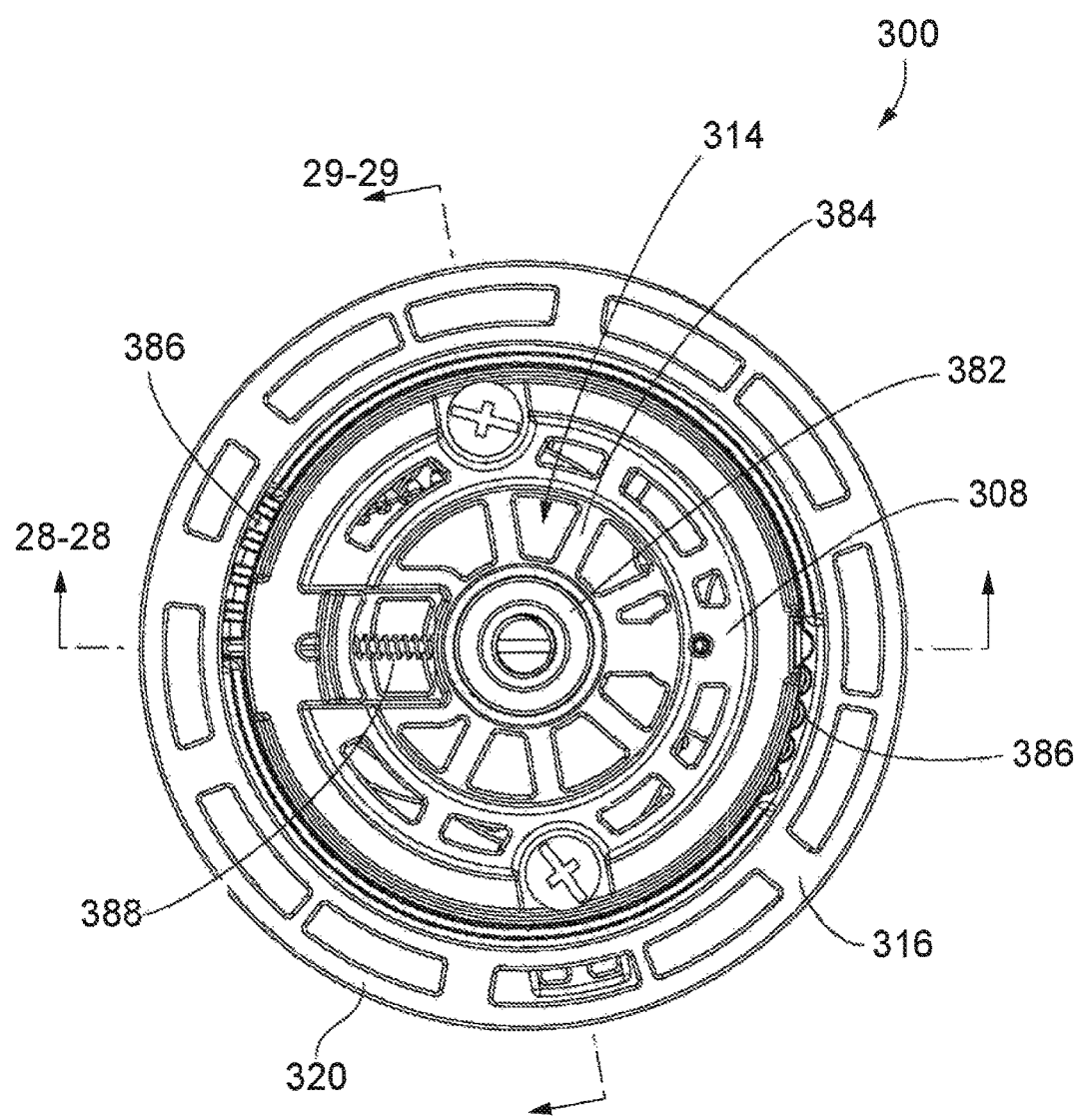
FIG. 27 is a top view of the adjustable stroke mechanism of FIG. 26.

FIG. 27 is a top view of the mechanism 300 and further depicts the above-described locking pin 388, top plate 308, orifices 314, and mount 382. Additionally, FIG. 28 is a first cross-sectional view of FIG. 27 taken along line 28-28 and further depicts the above described elements of locking pin 388 and their placement within the channel 390.

Each indentation 386 is located at a predetermined location to provide the user with measured stroke lengths ranging from a zero to a maximum stroke. The top plate 308 may include markings or measurement indicia (not shown) informing the user of the stroke length associated with each indentation 386.

Next, FIG. 29 illustrates a second cross-sectional view of FIG. 27 taken along 29-29, which depicts the positional relationship of the previously described parts within the cavity 306. The bottom plate 310 of the housing 302 is coupled to the wall 304 and top plate 308 of the housing 302 by way of a plurality of fasteners 410, such as but not limited to the screws shown in the figures. As described in previous embodiments of the invention, the fasteners 410 provide a pivot axle and/or an axis of rotation for the counterweight 334, counterweight drive gear 340, bearing carriage 342, and bearing carriage drive gear 348. In addition, the fasteners 410 help maintain the proper alignment of these components 334, 340, 342, 348 within the cavity 306.

In the representative embodiment of the invention, a first fastener 412 of the plurality of fasteners 410 acts as a pivot point for the bearing carriage 342 and an axis of rotation for the counterweight drive gear 340. A second fastener 414 of the plurality of fasteners 410 acts as a pivot point for the counterweight 334 and an axis of rotation for the bearing carriage drive gear 348. In other embodiments of the invention, any number of fasteners may be used to create pivot points and axes of rotation for the components 334, 340, 342, 348.

FIG. 29 further depicts an inner threading 416 disposed within the mount 382. The inner threading 416 assists with coupling the adjustable stroke mechanism 300 to a machine, such as, but not limited to the random orbital machine. Alternative embodiments of the invention may include other coupling means in place of the inner threading 416. FIG. 29 also depicts the inner and outer threading 362, 364 of the backing plate mount 358, which assists with coupling the adjustable stroke mechanism 300 to a tool. Embodiments of the adjustable stroke mechanism 300 may include both the inner and outer threading 362, 364, only the inner threading 362, only the outer threading 364, or other coupling means known in the art.

Figure 30:
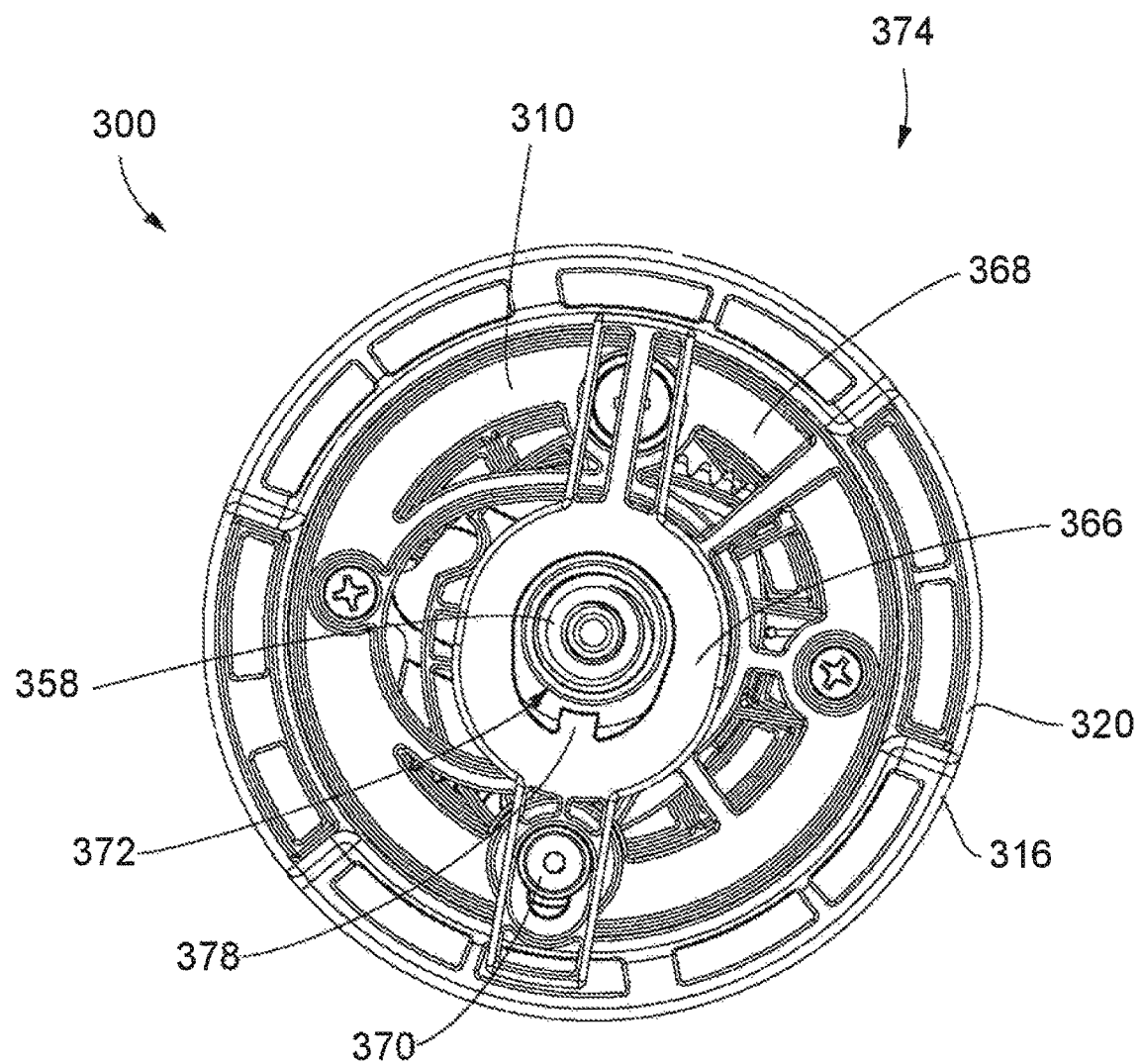
FIG. 30 is a bottom view of the adjustable stroke mechanism of FIG. 26 in an unlocked position.

Now referring to FIG. 30, a bottom view of the adjustable stroke mechanism 300 is shown with the locking plate 366 in the unlocked position 374. When the locking plate 366 is in the unlocked position 374 the tab 378 of the locking plate 366 is removed from the slot 380 of the backing plate mount 358, As a result, the backing plate mount 358 and the bearing axle 354 are able to move, and, as a result, the adjuster ring 316 is able to move.

Figure 31:
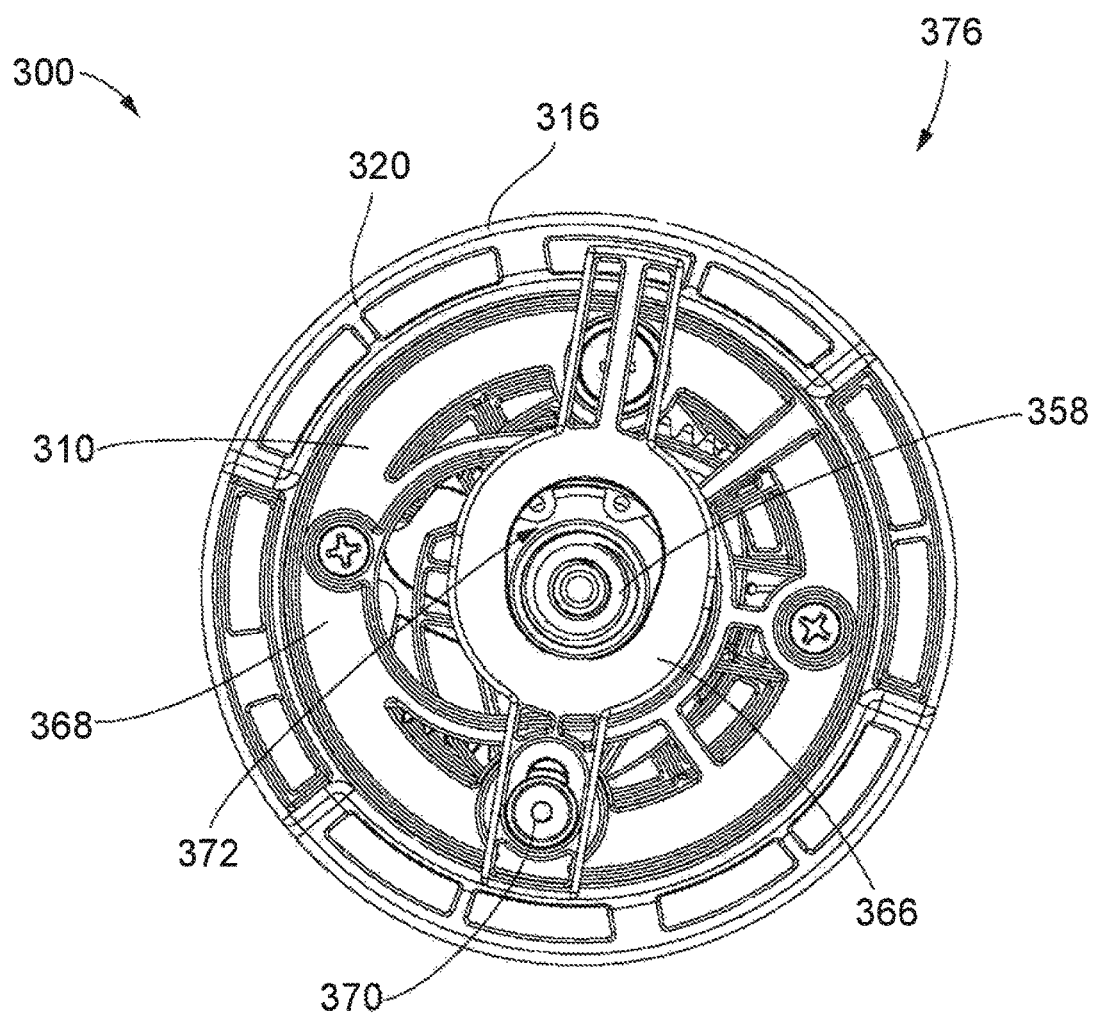
FIG. 31 is a bottom view of the adjustable stroke mechanism of FIG. 26 in a locked position.

FIG. 31 depicts a bottom view of the adjustable stroke mechanism 300 with the locking plate 366 in the locked position 376. As previously described, the locking plate 366 includes an orifice 372 and a tab 378. The backing plate mount 358 is disposed within the orifice 372, and the tab 378 is configured to extend into the orifice 372. In the locked position 376, the tab 378 extends into the slot 380 formed in the backing plate mount 358 in order to retain the backing plate mount 358 to prevent movement of the bearing axle 354 and the bearing carriage 342, and, as a result, prevent movement of the adjuster ring 316.

Figure 32:
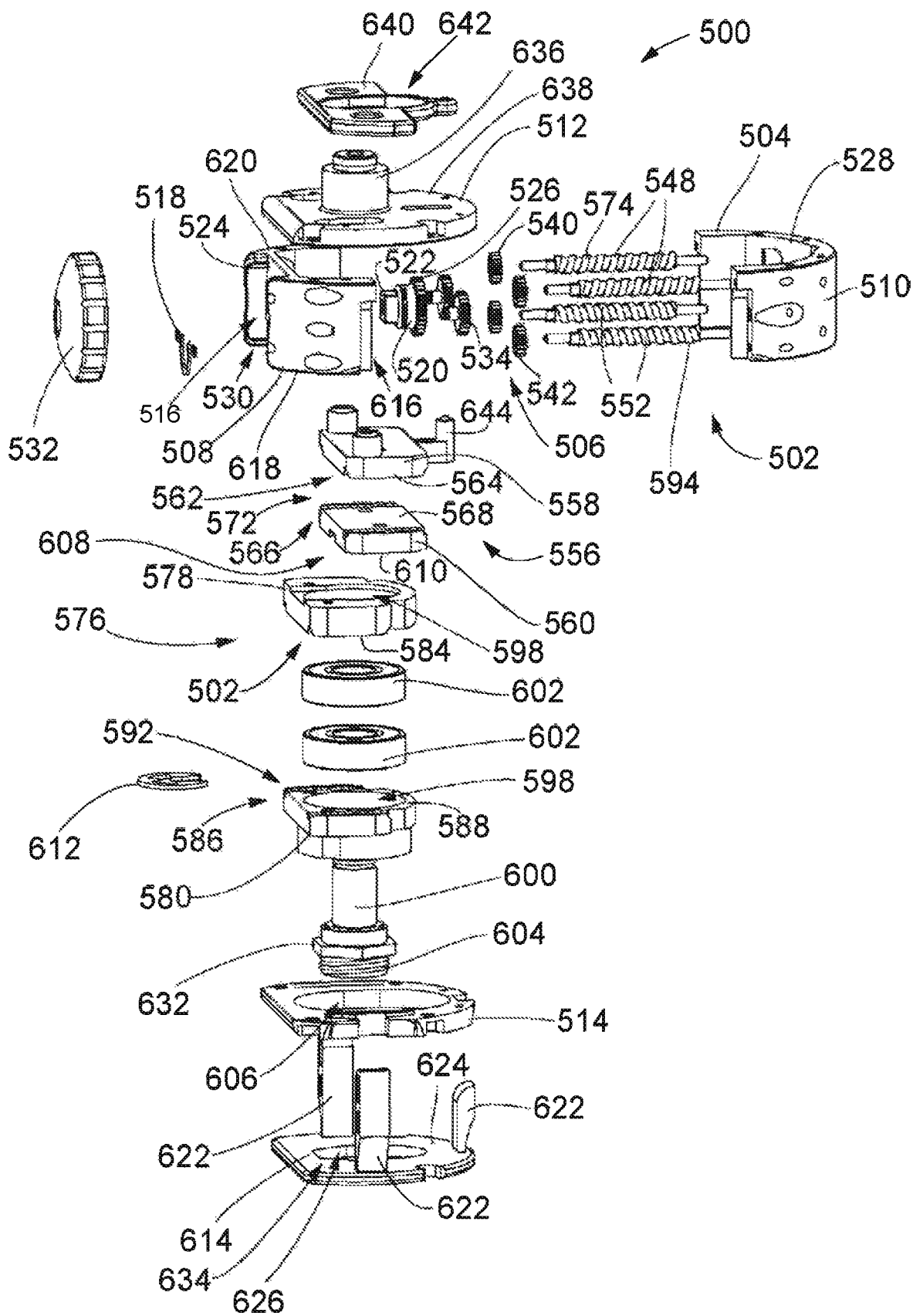
FIG. 32 is an exploded perspective view of a fifth embodiment of an adjustable stroke mechanism for a random orbital machine, according to the present invention.

Referring now to FIG. 32, an exploded isometric view of an adjustable stroke mechanism 500 is shown, according to another embodiment of the invention. The mechanism 500 includes a housing 502 having a wall 504 surrounding a cavity 506. As shown in the representative embodiment of the invention, the wall 504 is depicted as including a first wall segment 508 and a second wall segment 510, which when coupled together form a circular shaped wall 504. In alternative embodiments of the invention, the wall 504 may include more or less than (2) wall segments and may be in the form of any number of shapes. In addition, the housing 502 includes a top plate 512 oriented perpendicular to the wall 504 and bottom plate 514 oriented perpendicular to the wall 504 and disposed opposite the top plate 512. The top plate 512 provides an upper limit to the cavity 506, and the bottom plate 514 provide a lower limit to the cavity 506.

As shown in FIG. 32, the first wall segment 508 includes a drive gear slot 516 formed in the outer surface 524 of the wall 504. A drive gear 520 extends through the drive gear slot 516 and is configured to have a mounting end 522 disposed adjacent an outer surface 524 of the wall 504 and a gear end 526 disposed adjacent an inner surface 528 of the wall 504. In the representative embodiment of the invention, the outer surface 524 of the wall 504 includes an indentation 530 surrounding the drive gear slot 516. The indentation 530 is configured to receive an adjuster knob 532 which interfit with the mounting end 522 of the drive gear 520. As a result, rotation of the adjuster knob 532 in a clockwise or counterclockwise direction causes the drive gear 520 and its components to rotate in a corresponding clockwise or counterclockwise direction.

Once extending through the drive gear slot 516, a clip 518 is disposed around the drive gear 520 adjacent the outer surface 524 of the wall. The clip 518 is configured to fasten the drive gear 520 in place.

While FIG. 32 illustrates the indentation 530 having a depth equal to the thickness of the adjuster knob 532, other embodiments of the invention may include an indentation 530 that is deeper or shallower than the thickness of the adjuster knob 532. Further embodiments of the invention may also forgo the indentation 530 altogether.

At least one idle gear 534 is disposed within the cavity 506 of the housing 502. While the preferred embodiment of the invention depicts the use of two (2) idle gears 534, other embodiments of the invention may include more or less than two (2) idle gears 534. Each idle gear 534 includes a set of gear teeth 536 configured to mesh with a set of gear teeth 538 disposed on the gear end 526 of the drive gear 520. As a result of the above, rotation of the adjuster knob 532 is translated to rotation of the at least one idle gear 534 by way of the drive gear 520.

The adjustable stroke mechanism 500 may further include at least one counterweight screw gear 540 and at least one bearing carriage screw gear 542. Each counterweight screw gear 540 and bearing carriage screw gear 542 include a set of gear teeth 544, 546, respectively. The sets gear teeth 544, 546 are configured to mesh with the set of gear teeth 536 of the idle gear 534. As a result of the above, rotation of the adjuster knob 532 is translated to rotation of the counterweight and bearing carriage screw gears 540, 542 by way of the drive gear 520 and the at least one idle gear 534. While FIG. 32 depicts two (2) counterweight screw gears 540 and two (2) bearing carriage screw gears 542, other embodiments of the invention may include more or less than two (2) counterweight and bearing carriage screw gears 540, 542, respectively.

At least one counterweight drive screw 548 is disposed within the cavity 506 of the housing 502. Each counterweight drive screw 548 is configured to interfit with a respective one of the at least one counterweight screw gear 540. In the representative embodiment of the invention, the counterweight drive screw 548 extends through an orifice 550 centrally formed through the thickness of the counterweight screw gear 540. Further, the counterweight drive screw 548 is coupled to the counterweight screw gear 540, so that rotation of the counterweight screw gear 540 causes rotation of the counterweight drive screw 548.

Similarly, at least one bearing carriage drive screw 552 is disposed within the cavity 506 of the housing 502. Each bearing carriage drive screw 552 is configured to interfit with a respective one of the at least one bearing carriage screw gear 542. In FIG. 32, the bearing carriage drive screw 552 extends through an orifice 554 centrally formed through the thickness of the bearing carriage screw gear 542. In addition, the bearing carriage drive screw 552 is coupled to the bearing carriage screw gear 542, so that rotation of the bearing carriage screw gear 542 causes rotation of the bearing carriage drive screw 552.

As shown in FIG. 32, the counterweight and bearing carriage drive screws 548, 552 are rotatably mounted to the inner surface 528 of the wall 504 of the housing 502. As a result, the counterweight and bearing carriage drive screws 548, 552 are secured within the cavity 506, while also being allowed to freely rotate in response to rotation of the adjuster knob 532. While the representative embodiment of the invention depicts the use of two (2) counterweight drive screws 548 and two (2) bearing carriage drive screws 552, other embodiments of the invention may independently use any number of counterweight and bearing carriage drive screws 548, 552.

In alternative embodiments of the invention, it is contemplated that the mechanism would not include the idle gear 534 and that the gear teeth 538 of the drive gear 520 may directly mesh with the gear teeth 544, 546 or the counterweight and bearing carriage screw gears 540, 542, respectively. In yet other embodiments of the invention, additional idle gears 534 may disposed between the drive gear 520 and counterweight and bearing carriage screw gears 540, 542.

The adjustable stroke mechanism 500 may include counterweight 556 disposed in the cavity 506 of the housing 502. In the representative embodiment of the invention, the counterweight 556 includes an upper segment 558 and a lower segment 560 coupled together. The upper segment 558 includes at least one channel 562 formed in a bottom surface 564 thereof along the length of the upper segment 560. Similarly, the lower segment 560 includes at least one channel 566 formed in a top surface 568 thereof along the length of the lower segment 560. When the upper and lower segments 558, 560 are coupled together to form the counterweight 556, each channel 562 is aligned with a respective channel 566 to create at least one drive screw pathway 570 for a respective one of the at least one counterweight drive screw 548. Each drive screw pathway 570 includes threads 572 configured to interfit with threads 574 of the counterweight drive screw 548. As a result of the threads 574, when the counterweight drive screw 548 is rotated, the counterweight 556 moves side to side within the housing 502 along the length of the counterweight drive screw 548.

The adjustable stroke mechanism 500 may also include a bearing carriage 576 disposed within the cavity 506 of the housing 502. As shown in FIG. 32, the bearing carriage includes an upper segment 578 and a lower segment 580 coupled together. The upper segment 578 includes at least one channel 582 formed in a bottom surface 584 thereof along the length of the upper segment 578. Similarly, the lower segment 580 includes at least one channel 586 formed in a top surface 588 thereof along the length of the lower segment 580. When the upper and lower segments 578, 580 are coupled together to form the bearing carriage 576, each channel 582 of the upper segment 578 is aligned with a respective channel 586 of the lower segment 580 to create at least one drive screw pathway 590. Each drive screw pathway 590 is configured to receive a respective one of the at least one bearing carriage drive screw 552. Further, each drive screw pathway 590 includes threads 592 configured to interfit with threads 594 of the bearing carriage drive screw 552. As a result of the threads 592, 594, when the bearing carriage drive screw 552 is rotated, the bearing carriage 576 moves side to side within the housing 502 along the length of the bearing carriage drive screw 552.

In the representative embodiment of the invention, the counterweight drive screw 548 and drive screw pathway 570 are threaded opposite of the bearing carriage drive screw 552 and drive screw pathway 590. Therefore, when the adjuster knob 532 causes rotation of the counterweight and bearing carriage drive screws 548, 552, the counterweight 556 and the bearing carriage 576 move in opposite directions so as to offset the weight of the other and keep the mechanism 500 stable.

While the representative embodiment of the invention depicts the use of two (2) drive screw pathways 570, 590 in the counterweight 556 and bearing carriage 576, respectively, it is contemplated that each of the counterweight 556 and the bearing carriage 576 may independently include more or less than two (2) drive screw pathways 570, 590, respectively. The number of drive screw pathways 570 in the counterweight 556 aligns with the number of counterweight drive screws 548. Similarly, the number of drive screw pathways 590 in the bearing carriage 576 correlates to the number of bearing carriage drive screws 552.

As shown in FIG. 32, the upper and lower segments 578, 580 of the bearing carriage 576 may also include orifices 596, 598, respectively, formed through the thickness thereof. The orifices 596, 598 are aligned so as to extend through the thickness of the entire bearing carriage 576, when the upper and lower segments 578, 580 are coupled together. A bearing axle 600 extends through the orifices 596, 598 and is surrounded by at least one bearing 602, which is also disposed within the orifices 596, 598. The bearing axle 600 also includes a backing plate mount 604 that extends out of the cavity 506 through an orifice 606 formed in the bottom plate 514 of the housing 502.

In the representative embodiment of the invention, the bearing axle 600 extends through the orifices 596, 598 of the bearing carriage 576 and into a slot 608 formed in a bottom surface 610 of the lower segment 560 of the counterweight 556. The slot 608 is formed along the length of the counterweight 556 in not interfere with the opposite side to side movements of the counterweight 556 and the bearing carriage 576. As better illustrated in the cross-sectional views of FIGS. 36 and 37, which will be further described below, a clip 612 is disposed around the bearing axle 600 between the counterweight 556 and the bearing carriage 576 to maintain the bearing axle 600 in its vertical alignment.

In certain embodiments of the invention, the adjustable stroke mechanism 500 may include a locking plate 614. The locking plate 614 may be slidably coupled to the outer surface 524 of the wall 504 of the housing 502. In the representative embodiment of the invention, the outer surface 524 of the wall 504 of the housing 502 includes at least one slot 616 extending from a bottom surface 618 of the wall 504 to a location at or below a top surface 620 of the wall 504. The locking plate 614 includes at least one arm 622 extending from a top surface 624 of the locking plate 614. Each arm 622 is configured to be slidably engaged with a respective slot 616. While FIG. 32 illustrates the use of three (3) slots 616 and arms 622, it is contemplated that the adjustable stroke mechanism 500 may include more or less than three (3) slots 616 and arms 622, respectively.

The locking plate 614 includes an orifice 626 formed therein. The backing plate mount 604 extends through the orifice 626. The locking plate 614 is configured to be transitionable between a locked position 628 and an unlocked position 630. In the unlocked position 630, the bearing axle 600 is able to be moved between a number of predetermined positions to adjust the stroke of the mechanism 500. As a result, the adjuster knob 532 is able to be rotated. In the locked position 628, the orifice 626 grips the bearing axle 600 to prevent movement thereof. In turn, this prevents movement of the adjuster knob 532. In the representative embodiment of the invention, the bearing axle 600 includes a locking section 632 shaped having the perimeter of a hexagon. The orifice 626 includes a locking section 634 shaped identically to the locking section 632 of the bearing axle 600 in order to interfit and prevent movement when the locking plate 614 is in the locked position. In other embodiments of the invention, the locking section 632 may have the perimeter of any shape, while the locking section 634 has a matching shape.

Figure 33:
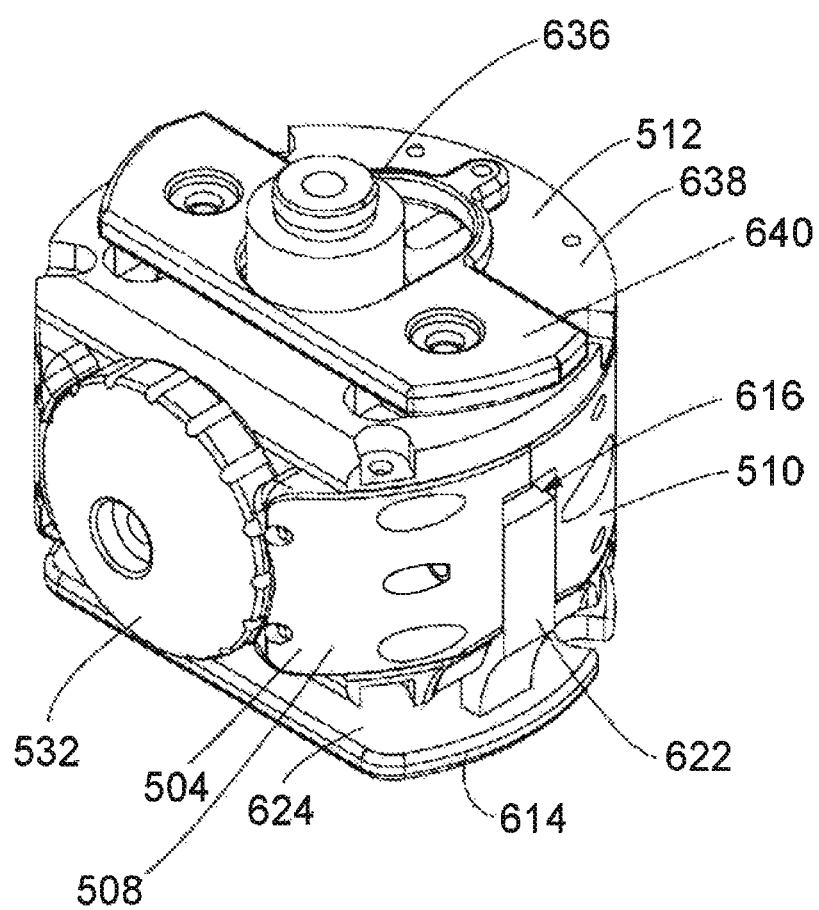
FIG. 33 is a perspective view of the adjustable stroke mechanism of FIG. 32.

FIG. 33 shows a perspective view of the adjustable stroke mechanism 500 completely assembled. According to an embodiment of the invention, a mount 636 is formed on the outer surface 638 of the top plate 512. The mount 636 is configured to interfit with a machine, such as but not limited to a random orbital machine, in order to attach the adjustable stroke mechanism 500 to the machine. When attached to a random orbital machine, the mechanism 500 may be housed with a shroud similar to the shroud 12 shown in FIG. 1.

In addition, the mechanism. 500 may include a balancing plate 640 slidably coupled to the outer surface 638 of the top plate 512. The balancing plate 640 includes an orifice 642 formed therethrough configured to receive the mount 636. The orifice 642 is shaped so as to allow the balancing plate 640 to shift along the length of the top plate 512 in order to assist with properly balancing the mechanism 500. At least one arm 644 extends from a top surface 646 of the upper segment 558 of the counterweight 556. Each arm 644 is configured to extend through orifices 648 formed through the top plate 512 and couple with the balancing plate 640. As a result, the balancing plate 640 moves with the counterweight 556.

In certain embodiments of the invention, the balancing plate 640 may be replaced with an alternative balancing plate having a different weight. For instance, in some embodiments of the invention the backing plate mount 604 may be changed by a user. In such an instance, the user would want to change the balancing plate 640 to keep the adjustable stroke mechanism 500 in perfect balance.

Figure 34:
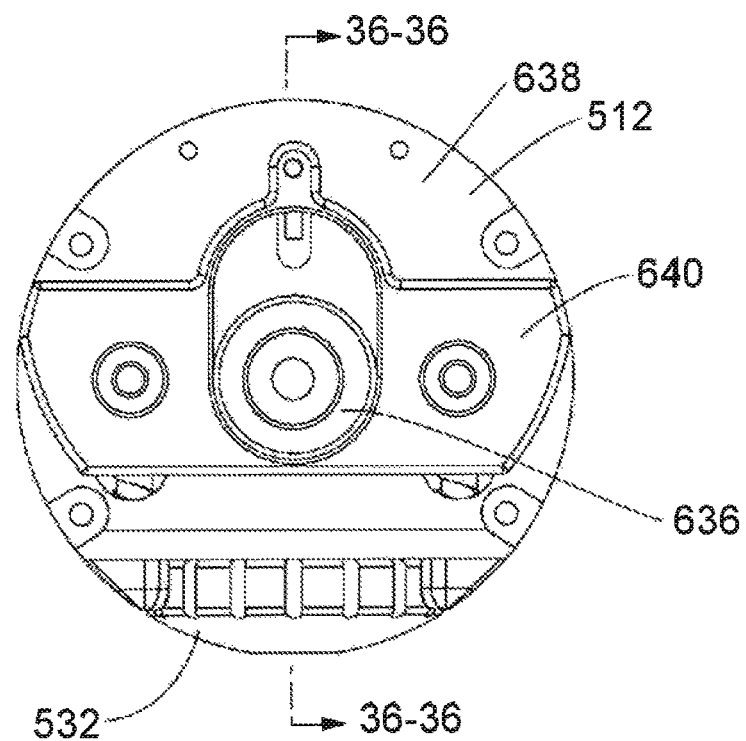
FIG. 34 is a top view of the adjustable stroke mechanism of FIG. 32 in a fully retracted, zero stroke position.
Figure 35:
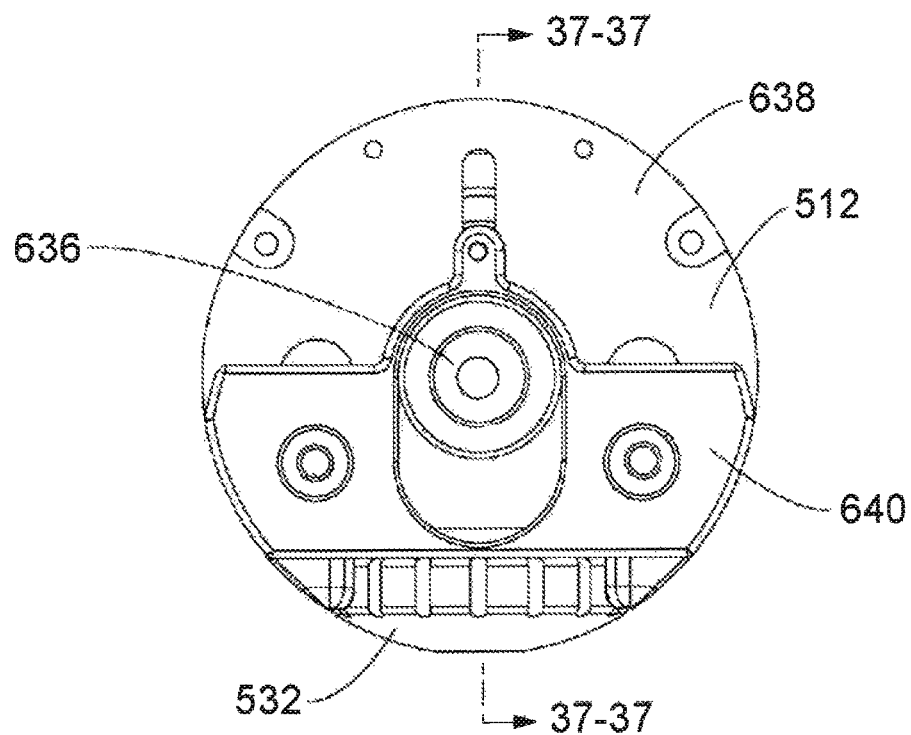
FIG. 35 is a top view of the adjustable stroke mechanism of FIG. 32 in a fully extended, maximum stroke position.

Next, FIGS. 34 and 35 illustrate a top view of the adjustable stroke mechanism 500 in a fully retracted, zero stroke position 650 and a fully extended, maximum stroke position 652, respectively. The adjustable stroke mechanism 500 may also be used in any position between those shown in FIGS. 34 and 35. In particular, the balancing plate 640 is shown as shifting with the counterweight 556 as the counterweight 556 and the bearing carriage 576 shift within the cavity 506 of the housing 502.

Figures 36, 37:
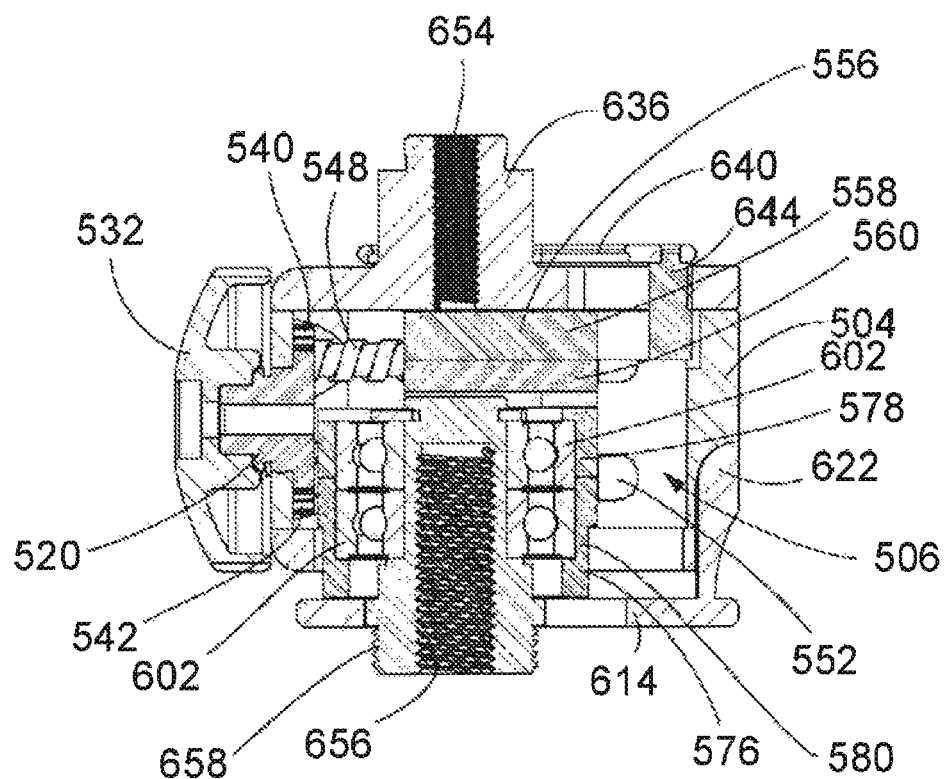
FIG. 36 is a cross-sectional view of the adjustable stroke mechanism of FIG. 34 taken along line 35-35.
FIG. 37 is a cross-sectional view of the adjustable stroke mechanism of FIG. 35 taken along line 36-36.

FIG. 36 is a cross-sectional view of FIG. 34 taken along line 36-36, while FIG. 37 is a cross-sectional view of FIG. 35 taken along line 37-37. These views illustrate the relationship of parts within the cavity 506, as described above.

As shown in FIGS. 36 and 37, the mount 636 may include an inner threading 654 to assist with coupling the mechanism 500 to a machine, such as, but not limited to a random orbital machine. In other embodiments of the invention, other coupling means may be used in place of the inner threading 654. FIGS. 36 and 37 also show the backing plate mount 604 having an inner threading 656 and an outer threading 658 to assist with coupling the mechanism 500 to a tool, such as, but not limited to a buffing pad. It is contemplated that alternative embodiments of the invention may include both the inner threading 656 and the outer threading 658, only the inner threading 656, only the outer threading 658, or another coupling means alone or in conjunction with the inner and outer threadings 656, 658.

Figure 38:
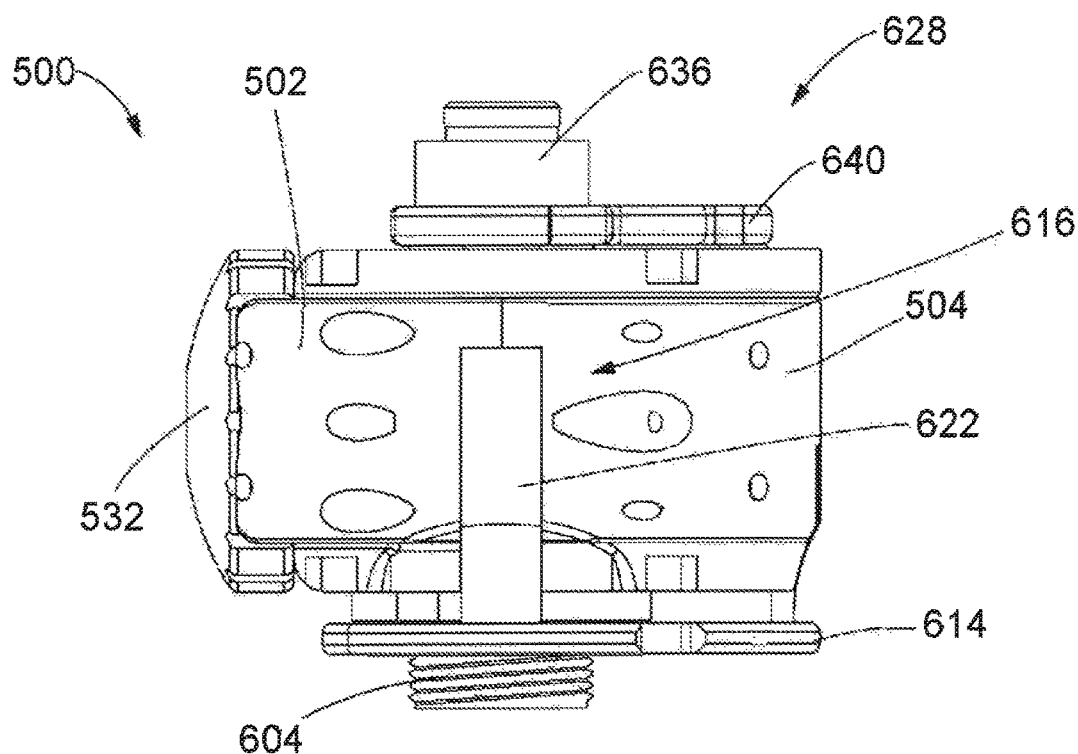
FIG. 38 is a bottom view of the adjustable stroke mechanism of FIG. 32 in a locked position.
Figure 39:
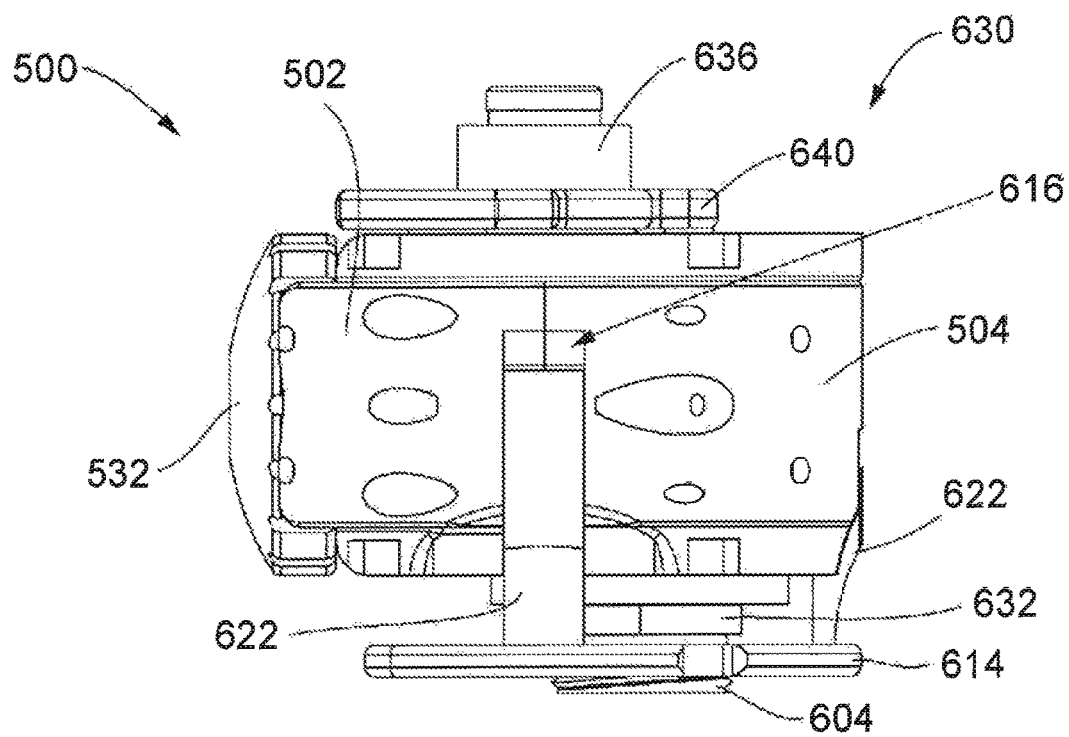
FIG. 39 is a bottom view of the adjustable stroke mechanism of FIG. 32 in an unlocked position.

Referring now to FIGS. 38 and 39, the adjustable stroke mechanism 500 is shown with the locking plate 614 in the locked position 628 and the unlocked position 630, respectively. When in the locked position 628 of FIG. 38, the arms 622 slide within the slots 616 so as to raise the locking plate 614. When raised, the locking section 634 of the orifice 626 of the locking plate 614 is engaged with the locking section 632 of the bearing axle 600. As previously described, the engagement of the locking sections 632, 634 prevents movement of the bearing axle 600, which in turn prevents movement of the adjuster knob 532, the counterweight 556, and the bearing carriage 576.

When in the unlocked position 630 of FIG. 39, the arms 622 slide within the slots 616 so as to lower the locking plate 614. When lowered, the locking section 634 of the orifice 626 of the locking plate 614 is disengaged with the locking section 632 of the bearing axle 600. As previously discussed, when the locking sections 632, 634 are disengaged, the bearing axle is free to move, which in turn allows movement of the adjuster knob 532, the counterweight 556, and the bearing carriage 576.

Figure 40:
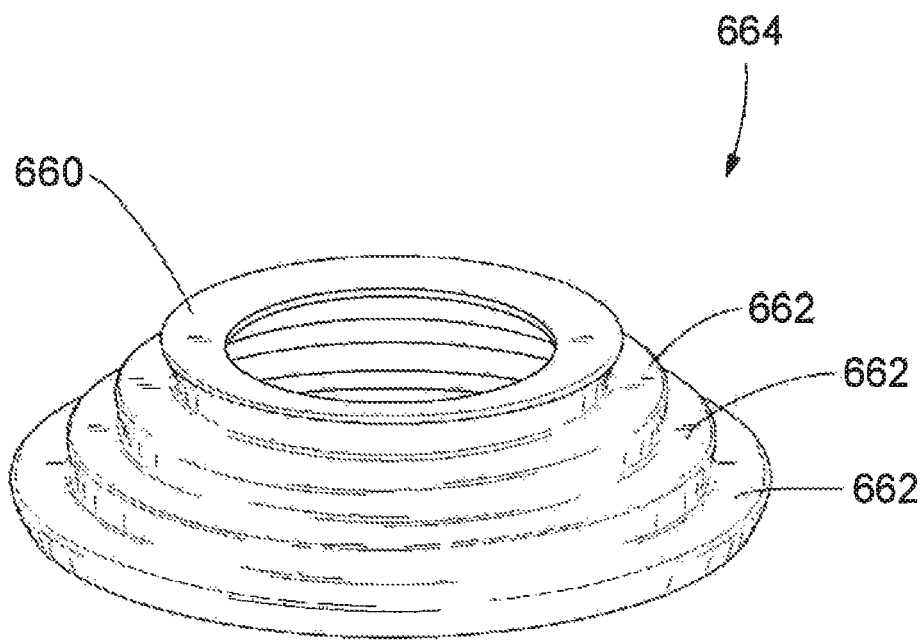
FIG. 40 is a perspective view of a collapsible shroud in an extended position, according to an embodiment of the invention.
Figure 41:
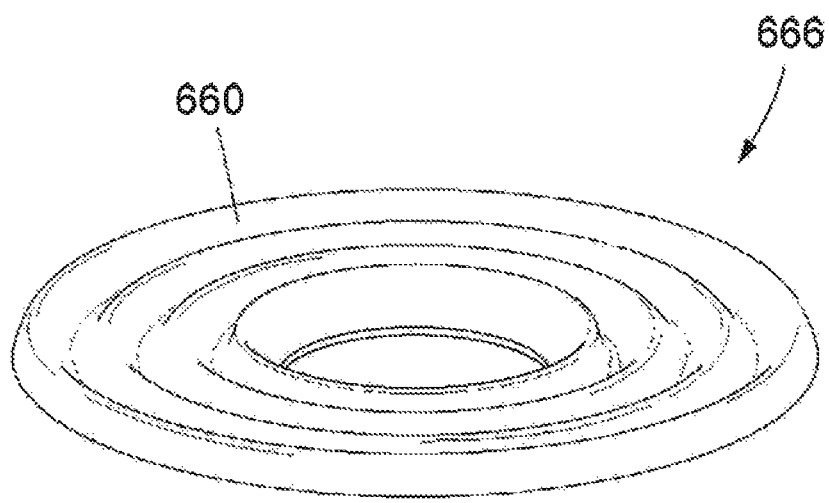
FIG. 41 is a perspective view of the collapsible shroud of FIG. 40 in a collapsed position.

Now referring to FIGS. 40 and 41, a shroud 660 for use with the random orbital machine and adjustable stroke mechanisms is shown. As earlier described, the adjustable stroke mechanisms may be disposed within a shroud of the random orbital machine. According to a representative embodiment of the invention, the shroud of the random orbital machine may be shroud 660. Shroud 660 is made from a material allowing the shroud 660 to collapse. In the representative embodiment of the invention, the shroud 660 is stepped down to assist with collapsibility of the shroud 660. As a result, the shroud 660 includes a series of ridges 662 as it is stepped down. Embodiments of the invention may include any number of ridges 662 to create any sized shroud 660. FIG. 40 shows the shroud 660 in an extended position 664, while FIG. 41 shows the shroud 660 in a collapsed position 666. In the extended position 664, the shroud 660 includes a protective cavity 668, which is surrounded by the outer surface 670 of the shroud 660. In the retracted position 666, the protective cavity 668 and anything disposed therein is exposed, the benefits of which will be described below.

If the weight of the counterweight 556 and the weight of the bearing carriage 576 are equal, the counterweight 556 and the bearing carriage 576 have a 1:1 movement balancing ratio in order to maintain balance of the adjustable stroke mechanism 500. In embodiments of the invention where the counterweight 556 weighs less than the bearing carriage 576, the counterweight 556 and the bearing carriage move at different rates to maintain balance of the adjustable stroke mechanism 500. For example, if the weight of the counterweight 556 was half of the weight of the bearing carriage 576, the counterweight 556 and the bearing carriage 576 would have a 2:1 movement balancing ratio. In embodiments of the invention including the balancing plate 640, the weight of the balancing plate 640 is added to the weight of the counterweight 556 to determine the movement balancing ratio with the bearing carriage 576.

As described earlier, with respect to the various embodiments of the adjustable stroke mechanism, the mechanism is disposed within a shroud when coupled to a machine, such as a random orbital machine. The collapsible shroud 660 shown in FIGS. 40 and 41 allows a user to collapse the shroud 660 and gain access to the mechanism without removing the mechanism from the machine. As such, a user is able to quickly adjust the stroke of the mechanism without having to take the time to remove the mechanism from the machine.

It is specifically intended that the present invention not be limited to the embodiments and illustrations contained herein, but includes modified forms of those embodiments including portions of the embodiments and combinations of elements of different embodiments as come within the scope of the following claims.

What is claimed is:

1. An adjustable stroke mechanism for a random orbital machine comprising:
   a housing having a wall enclosing a cavity;
   an adjuster disposed on an outer surface of the wall of the housing; a counterweight disposed within the housing, the counterweight having an orifice formed therein;
   a bearing carriage disposed within the housing, the bearing carriage having an orifice formed therein; and
   an adjustment mechanism configured to cause movement of the counterweight and bearing carriage in response to rotation of the adjuster such that the bearing carriage moves in a first direction and the counterweight moves in a different direction.

2. The adjustable stroke mechanism of claim 1 wherein the adjuster comprises an adjuster ring surrounding an outer surface of the wall of the housing, the adjuster ring having a first set of gear teeth along a first portion of an inner surface of the adjuster ring and a second set of gear teeth along a second portion of the inner surface of the adjuster ring.

3. The adjustable stroke mechanism of claim 2 wherein the adjustment mechanism comprises:
   a set of gear teeth disposed along an exterior surface of the counterweight;
   at least one counterweight gear disposed between the counterweight and the adjuster ring and within one of a plurality of apertures in the wall of the housing, the at least one counterweight gear configured to mesh with the first set of gear teeth of the adjuster ring and the set of gear teeth of the counterweight so that rotation of the adjuster ring causes movement of the counterweight;
   a set of gear teeth disposed along an exterior surface of the bearing carriage; and at least one bearing carriage gear disposed between the bearing carriage and the adjuster ring and within one of the plurality of apertures in the wall of the housing, the at least one bearing carriage gear configured to mesh with the second set of gear teeth of the adjuster ring and the set of gear teeth of the bearing carriage so that rotation of the adjuster ring causes movement of the bearing carriage.

4. The adjustable stroke mechanism of claim 1 wherein the adjuster comprises an adjuster knob disposed on an outer surface of the housing.

5. The adjustable stroke mechanism of claim 4 wherein the adjustment mechanism comprises:
   a drive gear having a set of gear teeth, the drive gear coupled to the adjuster knob so as to translate rotation of the adjuster knob to the drive gear;
   at least one idle gear, each idle gear having a set of gear teeth configured to mesh with the set of gear teeth of the drive gear;
   at least one counterweight screw gear, each counterweight screw gear having a set of gear teeth configured to mesh with the set of gear teeth of a respective one of the at least one idle gear;
   at least one bearing carriage screw gear, each bearing carriage screw gear having a set of gear teeth configured to mesh with the set of gear teeth of a respective one of the at least one idle gear;
   at least one counterweight drive screw coupled to a respective one of the at least one counterweight screw gear;
   at least one bearing carriage drive screw coupled to a respective one of the at least one bearing carriage screw gear;
   wherein rotation of the drive gear cause rotation of the at least one idle gear, causing rotation of the at least one counterweight screw gear, causing rotation of the at least one counterweight drive screw; and causing movement of the counterweight; and
   wherein rotation of the drive gear causes rotation of the at least one idle gear, causing rotation of the at least one bearing carriage screw gear, causing rotation of the at least one bearing carriage drive screw, and causing movement of the bearing carriage.

6. The adjustable stroke mechanism of claim 1 further comprising a bearing axle extending through a bottom plate of the housing, into the orifice of the bearing carriage, and into the orifice of the counterweight; and
   wherein the bearing axle comprises a backing plate mount configured to couple the adjustable stroke mechanism to a tool.

7. The adjustable stroke mechanism of claim 6 wherein the bearing axle includes at least one of an inner threading and an outer threading.

8. The adjustable stroke mechanism of claim 6 further comprising a locking device disposed on the bottom plate of the housing, the locking device having a first position configured to lock the bearing axle and prevent movement of the bearing carriage and a second position configured to unlock the bearing axle and allow movement of the bearing carriage.

9. A method of adjusting a stroke of a random orbital machine comprising:
   coupling an adjustable stroke mechanism to a random orbital machine, the adjustable stroke mechanism comprising:
      a housing having a wall enclosing a cavity;
      an adjuster disposed on an outer surface of the wall of the housing;
      a counterweight disposed within the cavity;
      a bearing carriage disposed within the cavity; and
      an adjustment mechanism disposed within the cavity;
   rotating the adjuster, which causes the adjustment mechanism to rotate;

wherein rotating the adjustment mechanism causes the counterweight to move: and wherein rotating the adjustment mechanism causes the bearing carriage to move in a first direction and the counterweight moves in a different direction.

10. The method of claim 9 wherein the adjuster comprises an adjuster ring surrounding an outer surface of the wall of the housing, the adjuster ring having a first set of gear teeth along a first portion of an inner surface of the adjuster ring and a second set of gear teeth along a second portion of the inner surface of the adjuster ring;
   wherein the adjustment mechanism comprises:
      a counterweight gear disposed between the counterweight and the adjuster ring; and
      a bearing carriage gear disposed between the bearing carriage and the adjuster ring;
   wherein rotating the adjuster comprises rotating the adjuster ring;
   wherein rotating the adjuster ring causes the counterweight gear to rotate and the counterweight to move, the counterweight gear configured to mesh with the first set of gear teeth of the adjuster ring, and the counterweight having a set of gear teeth configured to mesh with the counterweight gear; and
   wherein rotating the adjuster ring causes the bearing carriage gear to rotate and the bearing carriage to move, the bearing carriage gear configured to mesh with the second set of gear teeth of the adjuster ring, and the bearing carriage having a set of gear teeth configured to mesh with the bearing carriage gear.

11. The method of claim 9 wherein the adjuster comprises an adjuster knob disposed on an outer surface of the housing;
   wherein the adjustment mechanism comprises:
      a drive gear disposed within the cavity, the drive gear coupled to the adjuster knob in order to translate rotational motion of the adjuster knob to the drive gear;
      at least one idle gear disposed within the cavity, the idle gear having a set of gear teeth configured to mesh with the set of gear teeth of the drive gear;
      at least one counterweight screw gear disposed within the cavity, the at least one counterweight screw having a set of gear teeth configured to mesh with the set of gear teeth of a respective one of the at least one idle gear;
      at least one bearing carriage screw gear disposed within the cavity, the at least one bearing carriage screw gear having a set of gear teeth configured to mesh with the set of gear teeth of a respective one of the at least one idle gear;
      at least one counterweight drive screw coupled to a respective one of the at least one counterweight screw gear; and
      at least one bearing carriage drive screw coupled to a respective one of the at least one bearing carriage screw gear;
   wherein rotating the adjuster comprises rotating the adjuster knob;
   wherein rotating the adjuster knob causes rotation of the at least one idle gear, causing rotation of the at least one counterweight screw drive, and causing movement of the counterweight; and
   wherein rotation of the drive gear causes rotation of the at least one idle gear, causing rotation of the at least one bearing carriage screw drive, and causing movement of the bearing carriage.

12. The method of claim 9 wherein causing the bearing carriage to move causes the bearing axle to move and either increase or decrease the stroke.

13. The method of claim 9 further comprising coupling a backing plate mount of the bearing axle to a tool, the backing plate mount including at least one of an inner threading and an outer threading configured to interfit a tool.

14. The method of claim 9 further comprising locking the bearing axle in place by way of a locking plate secured to a bottom plate of the housing;
   wherein locking the bearing axle prevents movement of the bearing carriage, rotation of the adjustment mechanism, and rotation of the adjuster.

15. An adjustable stroke mechanism for a random orbital machine comprising:
   a housing having a top plate, a bottom plate, and a wall extending between the top plate and the bottom plate and enclosing a cavity;
   an adjuster disposed on an outer surface of the wall of the housing;
   a counterweight disposed within the cavity;
   a bearing carriage disposed within the cavity; and
   an adjustment mechanism disposed within the cavity and configured to cause movement of the counterweight and bearing carriage in response to rotation of the adjuster.

16. The adjustable stroke mechanism of claim 15 wherein the adjuster comprises an adjuster ring enclosing an outer surface of the wall of the housing, the adjuster ring having a first set of gear teeth along a first portion of an inner surface of the adjuster ring and a second set of gear teeth along a second portion of the inner surface of the adjuster ring; and
   wherein the adjustment mechanism comprises:
      at least one counterweight gear disposed between the counterweight and the adjuster ring and within a first aperture in the wall of the housing, the at least one counterweight gear configured to mesh with the first set of gear teeth of the adjuster ring and a set of gear teeth disposed along an exterior surface of the counterweight so that rotation of the adjuster ring causes movement of the counterweight; and
      at least one bearing carriage gear disposed between the bearing carriage and the adjuster ring and within a second aperture in the wall of the housing, the at least one bearing carriage gear configured to mesh with the second set of gear teeth of the adjuster ring and a set of gear teeth disposed along an exterior surface of the bearing carriage so that rotation of the adjuster ring causes movement of the bearing carriage.

17. The adjustable stroke mechanism of claim 15 wherein the adjuster comprises an adjuster knob; and
   wherein the adjustment mechanism comprises:
      a drive gear having a set of gear teeth, the drive gear coupled to the adjuster knob so as to translate rotation of the adjuster knob to the drive gear;
      at least one idle gear having a set of gear teeth configured to mesh with the set of gear teeth of the drive gear;
      at least one counterweight screw gear having a set of gear teeth configured to mesh with the set of gear teeth of a respective one of the at least one idle gear;
      at least one bearing carriage screw gear having a set of gear teeth configured to mesh with the set of gear teeth of a respective one of the at least one idle gear;

at least one counterweight drive screw coupled to a respective one of the at least one counterweight screw gear;

at least one bearing carriage drive screw coupled to a respective one of the at least one bearing carriage screw gear;

wherein rotation of the drive gear causes rotation of the at least one idle gear, causing rotation of the at least one counterweight screw gear, causing rotation of the at least one counterweight drive screw; and causing movement of the counterweight; and wherein rotation of the drive gear causes rotation of the at least one idle gear, causing rotation of the at least one bearing carriage screw gear, causing rotation of the at least one bearing carriage drive screw, and causing movement of the bearing carriage.

18. The adjustable stroke mechanism of claim 15 further comprising a bearing axle disposed within an orifice of the bearing carriage and extending outward from the bottom plate of the housing through an orifice in the bottom plate of the housing; and wherein the bearing axis includes a backing plate mount on a distal end thereof, the backing plate mount including at least one of an inner threading and an outer threading for mounting a tool thereon.

19. The adjustable stroke mechanism of claim 18 further comprising a lock plate coupled to the bottom plate of the housing and transitionable between a first position and a second position;

wherein the first position is configured to prevent the bearing axle from moving; and wherein the second position is configured to allow the bearing axle to move.

20. An adjustable stroke mechanism for providing a random orbital machine comprising:

a housing having a central axis and a wall enclosing a cavity; at least one counterweight movably disposed within the housing; a mounting assembly disposed within the housing, the mounting assembly including a mechanism to attach to a tool;

a stroke adjustor coupling the at least one counterweight with the mounting assembly, the stroke adjustor including at least one rotatable part disposed in the housing for enabling the counterweight and mounting assembly to move with respect to one another such that a lateral distance between the counterweight and the mounting assembly is variably adjusted which, in turn, variably adjusts a stroke radius of the mechanism to attach the tool with respect to the central axis of the housing.

21. The adjustable stroke mechanism of claim 20, wherein:

the stroke adjustor includes an adjuster ring surrounding the wall of the housing, the adjuster ring having a first set of gear teeth along a first portion of an inner surface of the adjuster ring and a second set of gear teeth along a second portion of the inner surface of the adjuster ring;

the counterweight has a cutout slot and a set of gear teeth along an exterior surface;

a first rotatable part disposed between the counterweight and the adjuster ring and meshing with the first set of gear teeth of the adjuster ring and the set of gear teeth of the counterweight so that rotation of the adjuster ring causes movement of the counterweight;

the mounting assembly including a bearing carriage disposed within the housing, the bearing carriage has an orifice and a set of gear teeth along an exterior surface;

a second rotatable part disposed between the bearing carriage and the adjuster ring within another of the plurality of apertures in the wall of the housing, the second rotatable part meshing with the second set of gear teeth of the adjuster ring and the set of gear teeth of the bearing carriage so that rotation of the adjuster ring causes movement of the bearing cage.

22. The adjustable stroke mechanism of claim 21, the mechanism for attaching the workpiece further comprising a bearing axle, the bearing axle extending through the housing, through the orifice of the bearing carriage, and into the cutout slot of the counterweight.

23. The adjustable stroke mechanism of claim 22, further comprising at least one bearing surrounding the bearing axle and the at least one bearing disposed within the orifice of the bearing carriage.

24. The adjustable stroke mechanism of claim 20, further comprising a locking plate for engaging the mechanism for attaching the tool to lock the locking plate in position.

25. The adjustable stroke mechanism of claim 24, wherein the locking plate further comprising an orifice and a tab, the tab engaging a slot in the mechanism for attaching the tool for locking the stroke adjuster.

26. The adjustable stroke mechanism of claim 24, wherein the locking plate includes an orifice, with a locking section, and at least one extending arm for coupling the locking plate with the housing.

27. A method of adjusting a stroke of a random orbital machine comprising:

coupling an adjustable stroke mechanism to a random orbital machine, the adjustable stroke mechanism comprising:

a housing having a central axis and a wall enclosing a cavity;

at least one counterweight movably disposed within the housing;

a backing plate mount assembly disposed within the housing; the backing plate mount assembly including a mechanism for attaching to a tool;

a stroke adjustor coupling the at least one counterweight with the mounting assembly, the stroke adjustor including at least one rotatable part disposed in the housing for enabling the counterweight and mounting assembly to move with respect to one another such that a lateral distance between the counterweight and the mounting assembly is variably adjusted which, in turn, variably adjusts a stroke radius of the mechanism to attach the workpiece tool with respect to the central axis of the housing.

\* \* \* \* \*

UNITED STATES PATENT AND TRADEMARK OFFICE
CERTIFICATE OF CORRECTION

PATENT NO. : 10,518,384 B2  
APPLICATION NO. : 15/678553  
DATED : December 31, 2019  
INVENTOR(S) : Scott S. McLain et al.

Page 1 of 1

It is certified that error appears in the above-identified patent and that said Letters Patent is hereby corrected as shown below:

In the Specification

Column 7  
Line 49     "tinge (s)" should be --finger(s)--.  
Line 60     "min" should be --minimum--.

Column 11  
Line 64     "user, in" should be --user. In--.

Column 14  
Line 6      "gripper 340" should be --gripper 320--.

Column 17  
Line 57     "358," (1st occurrence) should be --358--.

Column 21  
Line 42     "mechanism." should be --mechanism--.

Signed and Sealed this  
Twenty-fourth Day of March, 2020

Andrei Iancu  
*Director of the United States Patent and Trademark Office*